US012677719B2

(12) United States Patent
Johnson et al.

(10) Patent No.: US 12,677,719 B2
(45) Date of Patent: Jul. 14, 2026

(54) METHODS AND APPARATUS TO GENERATE AUTOMATED AGRICULTURAL VEHICLE PATHS

(71) Applicant: Deere & Company, Moline, IL (US)

(72) Inventors: David August Johnson, Durham, NC (US); Claudia R. Athens, Johnston, IA (US); Glen L. Oetken, Ankeny, IA (US); Amanda M. Charlton, Ankeny, IA (US)

(73) Assignee: Deere & Company, Moline, IL (US)

( * ) Notice: Subject to any disclaimer, the term of this patent is extended or adjusted under 35 U.S.C. 154(b) by 234 days.

(21) Appl. No.: 18/498,992

(22) Filed: Oct. 31, 2023

(65) Prior Publication Data

US 2025/0133978 A1     May 1, 2025

(51) Int. Cl.
*A01B 69/04*       (2006.01)
*G05D 1/00*        (2024.01)

(52) U.S. Cl.
CPC ......... *A01B 69/008* (2013.01); *G05D 1/0044* (2013.01); *G05D 1/0219* (2013.01)

(58) Field of Classification Search
None
See application file for complete search history.

(56) References Cited

U.S. PATENT DOCUMENTS

| | | |
|---|---|---|
| 8,204,654 B2 | 6/2012 | Sachs et al. |
| 2017/0090479 A1 | 3/2017 | Wilcox et al. |

OTHER PUBLICATIONS

Verge, "Feature Release: Selectable Edges & Precision Headings," VergeAg, Blog, URL:[https://vergeag.com/blog/post/feature-release-selectable-edges-precision-headings], retrieved on Sep. 21, 2023, 6 pages.

*Primary Examiner* — Jason Holloway
*Assistant Examiner* — Christopher A Buksa
(74) *Attorney, Agent, or Firm* — Hanley, Flight & Zimmerman, LLC

(57)     ABSTRACT

Systems, apparatus, articles of manufacture, and methods are disclosed to generate automated agricultural vehicle paths by receiving an indication of a field to be worked, obtaining boundary data of the field, determining edges of the boundary, analyzing the edges for a suitability of working the field, presenting edges in order of suitability, and generating an automated vehicle path for an automated vehicle to perform an agricultural function along.

18 Claims, 29 Drawing Sheets

306

314

1500

1506

1600

1606

1700

1706

312

316

OPERATE AUTOMATED VEHICLE ALONG VEHICLE PATH

DOES VEHICLE PATH NEED ADJUSTMENT? — 2300

NO

YES

RECEIVE OFFSET DATA — 2302

GENERATE VEHICLE PATH — 314

SEND VEHICLE PATH TO VEHICLE CONTROLLER — 2304

INSTRUCT AUTOMATED VEHICLE TO OPERATE ALONG GUIDANCE TRACKS — 2306

RETURN

METHODS AND APPARATUS TO GENERATE AUTOMATED AGRICULTURAL VEHICLE PATHS

FIELD OF THE DISCLOSURE

This disclosure relates generally to agricultural vehicles and, more particularly, to methods and apparatus to generate automated agricultural vehicle paths.

BACKGROUND

In recent years, agricultural vehicles have become increasingly automated. This automation is a consequence of economic pressures to increase productivity and decrease costs. Automating agricultural vehicles allows for precise and repeatable control of the agricultural vehicles that eliminates human error. Such precision control means that different agricultural vehicles (e.g., as tractors, sprayers, harvesters, etc.) can follow identical paths through fields. In turn, crops are grown without concern for accidental damage that can be caused by imprecise movement of the agricultural vehicles.

Automated agricultural vehicles follow planned paths consisting of parallel tracks (e.g., guidance tracks, passes) that direct the vehicles through a field. In many cases, these paths are arranged across the field such that the working implement of the vehicle performs an agricultural function on the entirety of the field as the vehicle traverses the paths. As such, the paths that direct the automated vehicles are often unique to the particular field and can vary depending on the agricultural vehicle being used.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
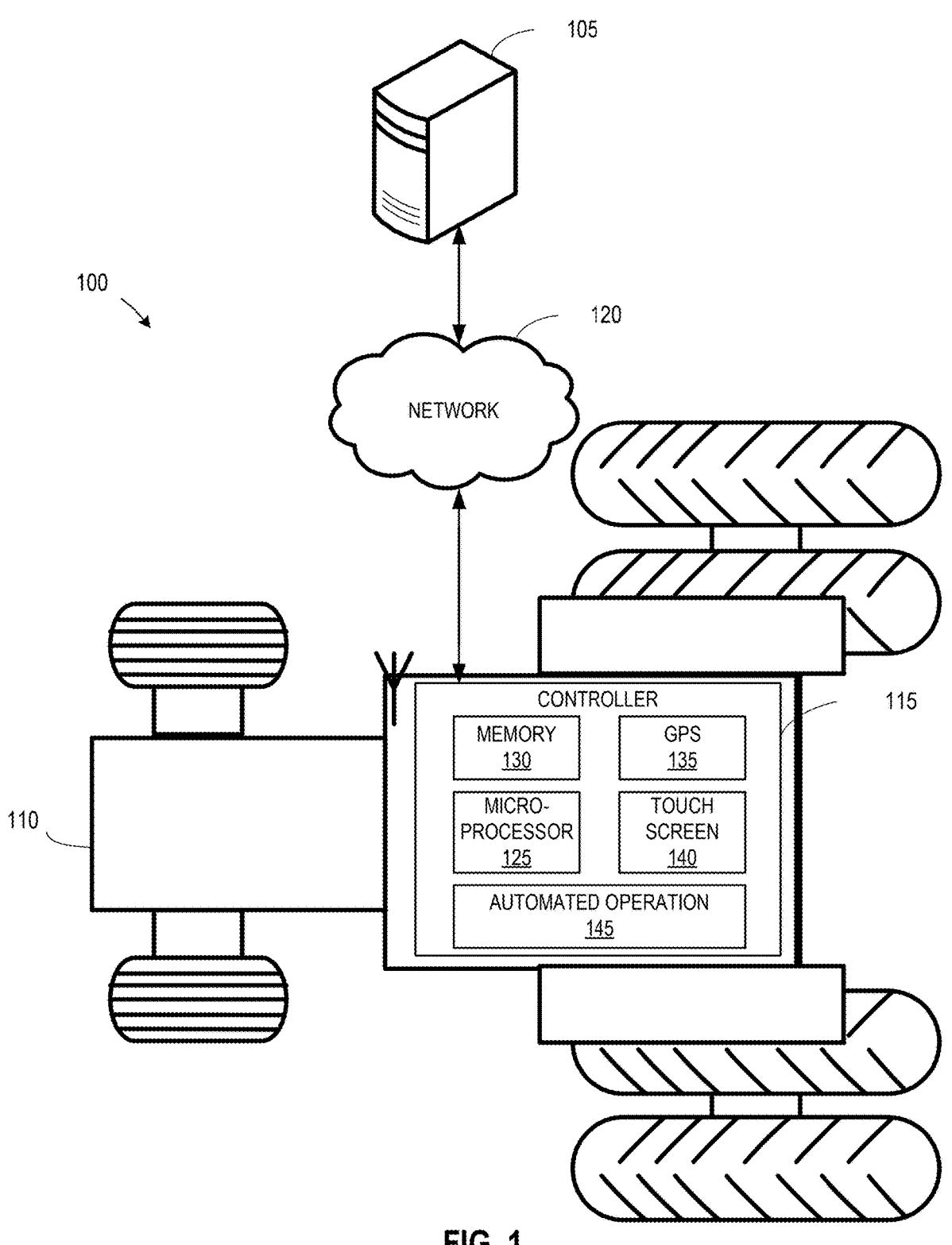
FIG. 1 is a block diagram of an example environment in which an example vehicle path generation server operates to generate a path for an example automated vehicle.

Operators of automated agricultural vehicles and other automated equipment often work within a mapped operating environment. The operators prefer to keep the working tools of the vehicles as productive as possible by aligning the motion of the vehicle with an edge of the mapped boundary. The vehicle will follow a straight-line path to pass the working tool through the operating environment. The vehicle will traverse the field with the working tool, turn, and return adjacent to the first path. In this way, the vehicle can cover the entire operating environment efficiently, with a reduced number of turns, passes, and/or cleanup passes. In the case of agricultural vehicles, this is often a tractor performing an agricultural operation over the entirety of a farm field. However, difficulties arise when attempting to align to a boundary. Boundaries that appear aligned in a direction (e.g., north to south, east to west, etc.) can have a heading that is a small degree off of the apparent direction. Over a length of the boundary, this small misalignment can result in a significant offset for particularly large operating environments.

Currently, methods and apparatus exist to automatically generate vehicle paths, particularly for automated agricultural vehicles. Typically, the vehicle paths will be generated based on a location and a heading entered by a user. If the user wants to generate a heading that aligns with a boundary edge, it can be difficult to do so. This is particularly true of boundaries that have unknown orientations or irregular edges. Some solutions allow the user to select points on the boundary to which a heading can be calculated. However, these solutions are prone to offset errors, and a user must have a precise interface (e.g., high resolution display and mouse input device) to accurately select points.

Example apparatus and methods disclosed herein generate vehicle paths that are automatically aligned to edges of a working boundary. The example apparatus and methods detect useful edges and presents them to a user for selection on a simple interface, such as a mobile device or vehicle mounted touch screen. Thus, a vehicle path can be generated based on an edge selected by the user quickly, easily, and repeatably. This is particularly true when a heading is difficult to define due to curved or irregular boundaries.

The example methods and apparatus disclosed herein refer mainly to agricultural equipment working a field to perform agricultural operations on one or more crops. However, it should be understood that these terms are used for convenience and can be used interchangeably for any other like term representing a working vehicle operating across an area with a known boundary. The boundary may encompass any working area such as a field, lawn, construction site, lot, or similar location. The vehicle may be any working equipment, automated or autonomous, that performs a task over an area with a working implement (e.g., an attached or towed implement). The work done can be of any nature (e.g., construction, agricultural, landscaping, etc.).

FIG. 1 is a block diagram of an example environment 100 in which an example vehicle path generation server 105 operates to generate a path for an example automated vehicle 110. The vehicle path generation server 105 communicates with an example controller 115 of the automated vehicle 110 through an example network 120. In some examples, the vehicle path generation server 105 is separate from the automated vehicle 110. In other examples, the vehicle path generation server 105 may be located within the automated vehicle 110 and/or the controller 115. The controller 115 includes an example microprocessor 125, example memory 130, example Global Positioning System (GPS) circuitry 135, example touch screen circuitry 140, and example automated operation circuitry 145.

The example automated vehicle 110, as illustrated in FIG. 1, is an automated agricultural tractor. In some examples, the automated vehicle 110 may have a working implement attached or towed behind it. In some examples, the automated vehicle 110 can be any automated agricultural vehicle (e.g., a combine, a planter, a sprayer, etc.). The vehicle path generation server 105 can send vehicle paths to any example automated vehicle, regardless of a type or a scope of work performed.

The controller 115 sends location data from the GPS circuitry 135 to the vehicle path generation server 105. The vehicle path generation server 105 uses the location data to identify a field to be worked and a respective boundary of the field. The controller 115 accepts user inputs from the touch screen circuitry 140 and sends those inputs to the vehicle path generation server 105. In some examples, the touch screen circuitry 140 is located in a device separate from the controller 115 (e.g., cell phone, tablet, secondary controller, etc.) that is in communication with the vehicle path generation server 105 through the network 120. The vehicle path generation server 105 generates vehicle paths based on user selected edges of the boundaries and sends them to the controller 115. The controller 115 directs the automated vehicle 110 to move along the vehicle path using the automated operation circuitry 145 and the GPS circuitry 135. In some examples, the controller 115 directs the automated vehicle 110 to move such that a working implement (e.g., an attached working implement, a towed working implement, etc.) of the vehicle 110 follows the vehicle path.

Figure 2:
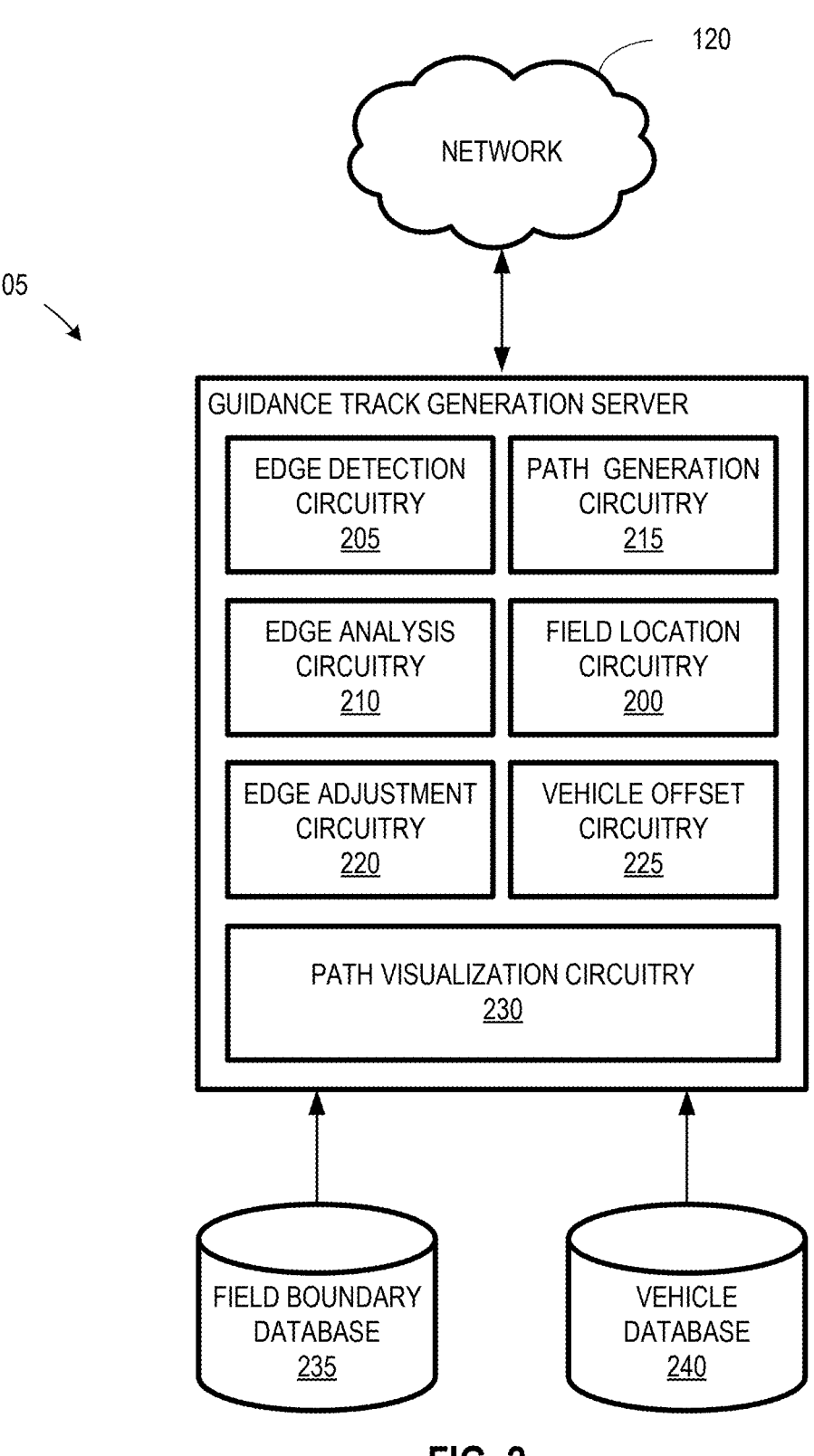
FIG. 2 is a block diagram of an example implementation of the vehicle path generation server of FIG. 1.

FIG. 2 is a block diagram of an example implementation of the vehicle path generation server 105 of FIG. 1 to generate automated vehicle paths. The vehicle path generation server 105 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the vehicle path generation server 105 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

The example vehicle path generation server 105 of FIG. 2 includes example field location circuitry 200, example edge detection circuitry 205, example edge analysis circuitry 210, example path generation circuitry 215, example edge adjustment circuitry 220, example vehicle offset circuitry 225, example path visualization circuitry 230, example field boundary database 235, and example vehicle database 240.

The field location circuitry 200 of the vehicle path generation server 105 uses location data to locate (e.g., indicate, determine, etc.) a field (e.g., operating environment) to be worked. In some examples, the field location circuitry 200 receives GPS data (e.g., location data from the GPS circuitry 135 of FIG. 1) to determine the location of the vehicle (e.g., the automated vehicle 110 of FIG. 1). In other examples, the field location circuitry 200 receives location data from a user input. The location of the vehicle is used to identify a boundary from the field boundary database 235. Once the boundary is identified, boundary data are loaded into the vehicle path generation server 105 for use with other circuitry within the server. In some examples, the boundary data are retrieved from the field boundary database 235. In other examples, the boundary data are retrieved from the memory 130 of the automated vehicle 110. Boundary data can be created directly by the automated vehicle 110 using data from the GPS circuitry 135 as the automated vehicle 110 is manually driven on the boundary. Alternatively, boundary data can be created through other means (e.g., portable GPS devices, satellite imagery, location data from other vehicles, manual entry, etc.). In some examples, the field location circuitry 200 is instantiated by programmable circuitry executing field location instructions and/or configured to perform operations such as those represented by the flowchart of FIG. 3.

In some examples, the vehicle path generation server 105 includes means for indicating a field to be worked. For example, the means for indicating may be implemented by field location circuitry 200. In some examples, the field location circuitry 200 may be instantiated by programmable circuitry such as the example programmable circuitry 2612 of FIG. 26. For instance, the field location circuitry 200 may be instantiated by the example microprocessor 2700 of FIG. 27 executing machine executable instructions such as those implemented by at least blocks 302 of FIG. 3. In some examples, field location circuitry 200 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the field location circuitry 200 may be instantiated by any other combination of hardware, software, and/or firmware. For example, the field location circuitry 200 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The edge detection circuitry 205 of the vehicle path generation server 105 analyzes boundary data to detect (e.g., determine, identify, etc.) the edges of the boundary. In other words, the boundary data are transformed into a series of segments that comprise the boundary of a corresponding field (e.g., working area) perimeter. In some examples, the boundary data are transformed into a series of equally spaced points by the edge detection circuitry 205 to correspond to geographic locations of the perimeter of a working area. The equally spaced points can be analyzed, as further detailed in FIG. 4, to determine a plurality of curvature measurements. In some examples, edges are continuous portions (e.g., sequential) of the boundary that are substantially straight. In other examples, edges are continuous portions (e.g., sequential) of the boundary that are above a threshold radius. Once all edges of the boundary are determined, the corresponding boundary data of the edges can be used by other circuitry in the vehicle path generation server 105. In some examples, the edge detection circuitry 205 is instantiated by programmable circuitry executing edge detection instructions and/or configured to perform operations such as those represented by the flowchart(s) of FIGS. 3 and 4.

In some examples, the vehicle path generation server 105 includes means for determining edges of a field boundary. For example, the means for determining may be implemented by edge detection circuitry 205. In some examples, the edge detection circuitry 205 may be instantiated by programmable circuitry such as the example programmable circuitry 2612 of FIG. 26. For instance, the edge detection circuitry 205 may be instantiated by the example microprocessor 2700 of FIG. 27 executing machine executable instructions such as those implemented by at least blocks 304, 400, 402, 404, 406, 408, 410, 412, and 414 of FIGS. 3 and 4. In some examples, the edge detection circuitry 205 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the edge detection circuitry 205 may be instantiated by any other combination of hardware, software, and/or firmware. For example, the edge detection circuitry 205 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The edge analysis circuitry 210 of the vehicle path generation server 105 of FIG. 2 analyzes (e.g., evaluates, sorts, ranks, etc.) edges identified by the edge detection circuitry 205. Complex field boundaries can have many edges that are not equally suitable for generating vehicle paths. For example, unsuitable edges may be too small, too curved, and/or too poorly aligned with other edges. The edge analysis circuitry 210 analyzes the identified edges for suitability of working the field. In some examples, edge suitability is a measure of straightness of the edge. In some examples an edge can be categorized as straight, drivably straight (e.g., less curved than a turning radius of a vehicle), or curved (e.g., more curved than a turning radius of a vehicle). In some examples, edge suitability is a length of the edge. In some examples, edge suitability is a measure alignment of the edge with the rest of the boundary (e.g., the average length of tracks generated, the standard deviation of track lengths generated, etc.). In other examples, the edge suitability is based on an efficiency (e.g., total amount of time spent, total driven length, number of turns, etc.) of the vehicle path generated by the edge. The edge analysis circuitry 210 ranks the identified edges in order of most suitable to least suitable for presentation to the user. In this way, the user is presented with a list of viable edges to base the vehicle path from, with the most suitable edges shown first. Thus, the user interface can be simplified as the user need not search through a list of edges in order to find the most suitable edge. This allows for a faster user experience that can utilize simpler interfaces (e.g., touch screens or mobile devices). In some examples, the edge analysis circuitry 210 is instantiated by programmable circuitry executing edge classification instructions and/or configured to perform operations such as those represented by the flowchart of FIG. 9.

In some examples, the vehicle path generation server 105 includes means for analyzing edges of a field boundary for suitability of working a field. For example, the means for analyzing may be implemented by edge analysis circuitry 210. In some examples, the edge analysis circuitry 210 may be instantiated by programmable circuitry such as the example programmable circuitry 2612 of FIG. 26. For instance, the edge analysis circuitry 210 may be instantiated by the example microprocessor 2700 of FIG. 27 executing machine executable instructions such as those implemented by at least blocks 306, 900, 902, 904, 906, 908, and 910 of FIGS. 3 and 9. In some examples, edge analysis circuitry 210 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the edge analysis circuitry 210 may be instantiated by any other combination of hardware, software, and/or firmware. For example, the edge analysis circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The path generation circuitry 215 of the vehicle path generation server 105 of FIG. 2 generates the vehicle path based on a selected edge of the boundary. The vehicle path includes perimeter tracks around the perimeter of the boundary (e.g., headland tracks) and parallel tracks (e.g., tracks substantially parallel with each other), the tracks representing a continuous portion or pass of the vehicle path, within the perimeter tracks. A working vehicle (e.g., automated vehicle 110) performs the majority of the work along the parallel tracks and works any non-linear or otherwise irregular portions of the field along the perimeter tracks. Thus, the entire area enclosed by the boundary is covered by the perimeter tracks and the parallel tracks. The tracks are spaced apart based on a working width of the automated vehicle. In some examples, the spacing is based on a working width of a working implement of the vehicle. In other examples, the spacing is based on a working width of an implement towed by the vehicle. In some examples, the path generation circuitry 215 is instantiated by programmable circuitry executing path generation instructions and/or configured to perform operations such as those represented by the flowchart of FIG. 10.

In some examples, the vehicle path generation server 105 includes means for generating vehicle paths. For example, the means for generating may be implemented by path generation circuitry 215. In some examples, the path generation circuitry 215 may be instantiated by programmable circuitry such as the example programmable circuitry 2612 of FIG. 26. For instance, the path generation circuitry 215 may be instantiated by the example microprocessor 2700 of FIG. 27 executing machine executable instructions such as those implemented by at least blocks 1000, 1002, 1004, 1006, 1008 of FIG. 10. In some examples, the path generation circuitry 215 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the path generation circuitry 215 may be instantiated by any other combination of hardware, software, and/or firmware. For example, the path generation circuitry 215 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The edge adjustment circuitry 220 of the vehicle path generation server 105 of FIG. 2 adjusts the endpoints of an edge determined by the edge detection circuitry 205. An edge has two endpoints (e.g., a start point and an end point opposite the start point). Some example boundaries have irregular or otherwise non-linear edges. While such irregular edges meet the requirements to be determined as a single edge, the entire edge may not be preferred (e.g., deemed suitable) by the user. Therefore, the edge adjustment circuitry 220 allows the user to modify the endpoints of an edge to be used for creating vehicle guidance paths. In some examples, the edge adjustment circuitry 220 is instantiated by programmable circuitry executing edge adjustment instructions and/or configured to perform operations such as those represented by the flowchart(s) of FIG. 19. The edge adjustment circuitry 220 is discussed in further detail below in reference to FIGS. 19-22.

In some examples, the vehicle path generation server 105 includes means for adjusting an edge. For example, the means for adjusting may be implemented by edge adjustment circuitry 220. In some examples, the edge adjustment circuitry 220 may be instantiated by programmable circuitry such as the example programmable circuitry 2612 of FIG. 26. For instance, the edge adjustment circuitry 220 may be instantiated by the example microprocessor 2700 of FIG. 27 executing machine executable instructions such as those implemented by at least blocks 312, 1900, 1902, 1904, and 1906 of FIGS. 3 and 19. In some examples, the edge adjustment circuitry 220 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the edge adjustment circuitry 220 may be instantiated by any other combination of hardware, software, and/or firmware. For example, the edge adjustment circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The vehicle offset circuitry 225 of the vehicle path generation server 105 of FIG. 2 receives vehicle data from the vehicle database 240 and communicates relevant data to the other circuitry of the vehicle path generation server 105. The vehicle database 240 contains dimensional and operational data about working vehicles that can be used with the vehicle path generation server 105. In some examples, the vehicle offset circuitry 225 sends width data corresponding to the width of a working implement attached to the automated vehicle 110 of FIG. 1 to the path generation circuitry 215. In some examples, the vehicle offset circuitry 225 sends turning radius data to the edge detection circuitry 205. In other examples, the vehicle offset circuitry 225 receives location data from the GPS circuitry 135 of the automated vehicle 110 and uses the location data to offset the vehicle paths. In some examples, the vehicle offset circuitry 225 is instantiated by programmable circuitry executing vehicle offsetting instructions and/or configured to perform operations such as those represented by the flowchart of FIG. 3.

In some examples, the vehicle path generation server 105 includes means for offsetting a vehicle path. For example, the means for offsetting may be implemented by vehicle offset circuitry 225. In some examples, the vehicle offset circuitry 225 may be instantiated by programmable circuitry such as the example programmable circuitry 2612 of FIG. 26. For instance, the vehicle offset circuitry 225 may be instantiated by the example microprocessor 2700 of FIG. 27 executing machine executable instructions such as those implemented by at least blocks 1000, 1004, and 2302 of FIGS. 10 and 23. In some examples, the vehicle offset circuitry 225 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the vehicle offset circuitry 225 may be instantiated by any other combination of hardware, software, and/or firmware. For example, the vehicle offset circuitry 225 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The path visualization circuitry 230 of the vehicle path generation server 105 of FIG. 2 generates images (e.g., screens) to be sent to a user device (e.g., controller 115). The path visualization circuitry 230 generates simplified representations of example vehicle paths, example boundaries, and example detected edges. The path visualization circuitry 230 generates icons, menus, and other visualizations to accept user inputs. The path visualization circuitry 230 receives user inputs and communicates them to other circuitry of the vehicle path generation server 105 as necessary. The path visualization circuitry 230 generates example images of vehicle icons to depict where a vehicle is located relative to the generated vehicle paths. In some examples, the path visualization circuitry 230 is instantiated by programmable circuitry executing path visualization instructions and/or configured to perform operations such as those represented by the flowcharts of FIGS. 3, 9, 19, and 23.

In some examples, the vehicle path generation server 105 includes means for visualizing vehicle paths. For example, the means for visualizing may be implemented by path visualization circuitry 230. In some examples, the path visualization circuitry 230 may be instantiated by programmable circuitry such as the example programmable circuitry 2612 of FIG. 26. For instance, the path visualization circuitry 230 may be instantiated by the example microprocessor 2700 of FIG. 27 executing machine executable instructions such as those implemented by at least blocks 302, 308, 310, 312, 316, 910, 1900, 1902, 2300 of FIGS. 3, 9, 19, and 23. In some examples, the path visualization circuitry 230 may be instantiated by hardware logic circuitry, which may be implemented by an ASIC, XPU, or the FPGA circuitry 2800 of FIG. 28 configured and/or structured to perform operations corresponding to the machine readable instructions. Additionally or alternatively, the path visualization circuitry 230 may be instantiated by any other combination of hardware, software, and/or firmware. For example, the path visualization circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the vehicle path generation server 105 of FIG. 1 is illustrated in FIG. 2, one or more of the elements, processes, and/or devices illustrated in FIG. 2 may be combined, divided, re-arranged, omitted, eliminated, and/or implemented in any other way. Further, the example field location circuitry 200, the example edge detection circuitry 205, the example edge analysis circuitry 210, the example path generation circuitry 215, the example edge adjustment circuitry 220, the example vehicle offset circuitry 225, the example path visualization circuitry 230, the example field boundary database 235, the example vehicle database 240, and/or, more generally, the example vehicle path generation server 105 of FIG. 2, may be implemented by hardware alone or by hardware in combination with software and/or firmware. Thus, for example, any of the example field location circuitry 200, the example edge detection circuitry 205, the example edge analysis circuitry 210, the example path generation circuitry 215, the example edge adjustment circuitry 220, the example vehicle offset circuitry 225, the example path visualization circuitry 230, the example field boundary database 235, the example vehicle database 240, and/or, more generally, the example vehicle path generation server 105, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example vehicle path generation server 105 of FIG. 2 may include one or more elements, processes, and/or devices in addition to, or instead of, those illustrated in FIG. 2, and/or may include more than one of any or all of the illustrated elements, processes and devices.

Flowcharts representative of example machine readable instructions, which may be executed by programmable circuitry to implement and/or instantiate the vehicle path generation server 105 of FIG. 2 and/or representative of example operations which may be performed by programmable circuitry to implement and/or instantiate the vehicle path generation server 105 of FIG. 2, are shown in FIGS. 3, 4, 9, 10, 19, and/or 23. The machine readable instructions may be one or more executable programs or portion(s) of one or more executable programs for execution by programmable circuitry such as the programmable circuitry 2612 shown in the example processor platform 2600 discussed below in connection with FIG. 26 and/or may be one or more function(s) or portion(s) of functions to be performed by the example programmable circuitry (e.g., an FPGA) discussed below in connection with FIGS. 27 and/or 28. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 3, 4, 9, 10, 19, and/or 23, many other methods of implementing the example vehicle path generation server 105 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3, 4, 9, 10, 19, and/or 23 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 3:
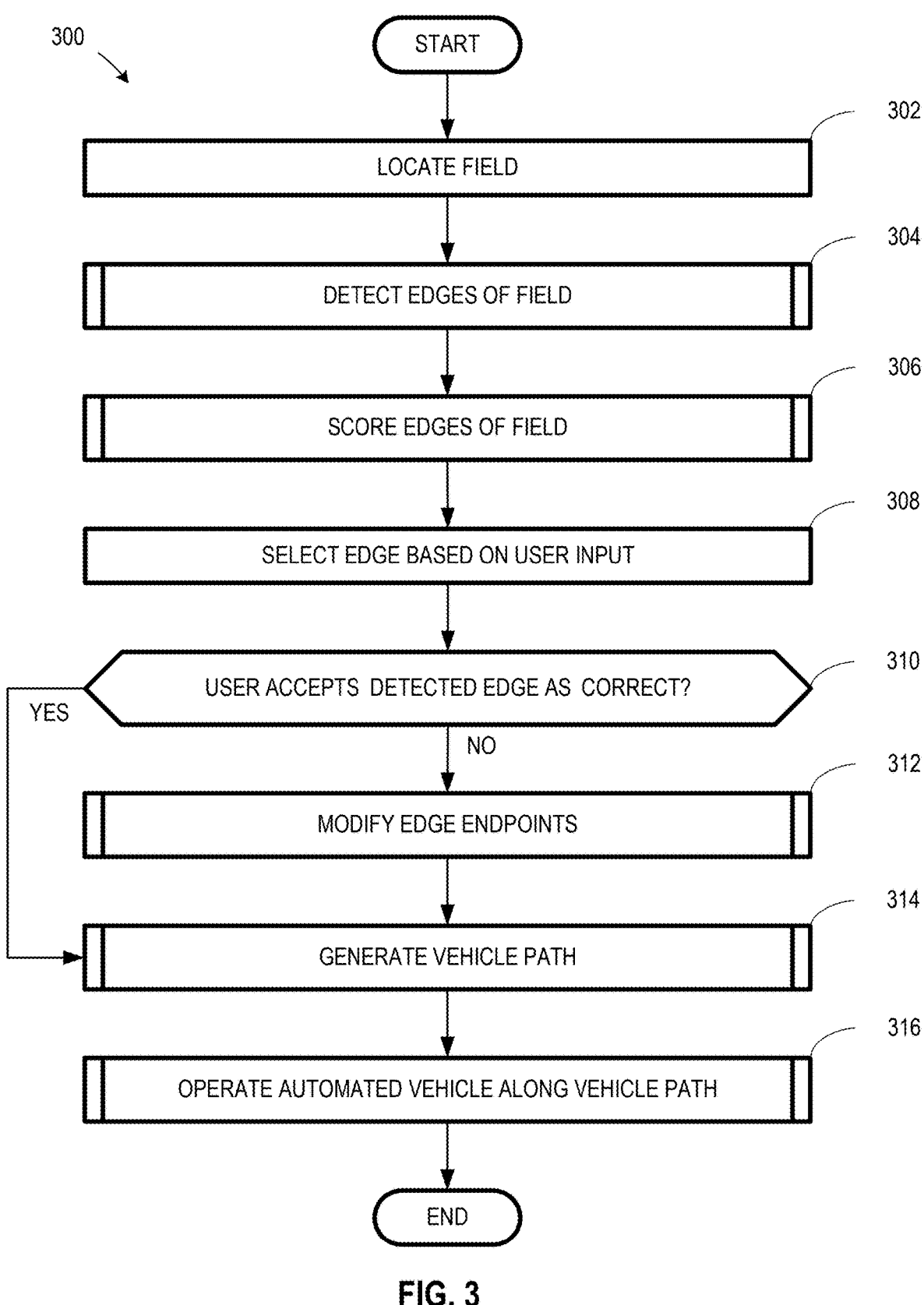
FIG. 3 is a flowchart representative of example machine readable instructions and/or example operations that may be executed, instantiated, and/or performed by example programmable circuitry to implement the vehicle path generation server of FIG. 2.

FIG. 3 is a flowchart representative of example machine readable instructions and/or example operations 300 that may be executed, instantiated, and/or performed by programmable circuitry to generate a vehicle path for an automated vehicle to operate along. The example machine-readable instructions and/or the example operations 300 of FIG. 3 begin at block 302, at which the example field location circuitry 200 operates to locate an example target field. The target field is a working area with a known boundary in which a vehicle (e.g., an agricultural vehicle) performs a task. The field location circuitry 200 uses location data to identify the target field and retrieve boundary data from the field boundary database 235. In some examples, location data are gathered from the vehicle (e.g., location data from the GPS circuitry 135 of the automated vehicle 110). In some examples, location data are input from the user from an input device (e.g., the touch screen circuitry 140). In some examples, the field location circuitry 200 may receive user input to select a target field from a list, generated by the path visualization circuitry 230, of neighboring fields in proximity to the location data received.

The example machine-readable instructions and/or the example operations 300 of FIG. 3 continue at block 304, at which the edge detection circuitry 205 operates to detect edges within the boundary data received from the field boundary database 235. The operation of block 304, further detailed in FIG. 4, contains instructions to analyze the boundary data and determine sections that could be suitable for edges (e.g., substantially straight, continuous, etc.). The edge detection circuitry 205 produces edge data that includes a series of location points defining the edge, a designated start point from the location points, and a designated endpoint from the location points. Thus, a set of consecutive points is formed defining the edge. The boundary may have any number of edges contained within. In some examples, the edges may have a minimum length or other threshold quality used to limit the total number of edges identified.

The example machine-readable instructions and/or the example operations 300 of FIG. 3 continue at block 306, at which the edge analysis circuitry 210 operates to analyze and score edges identified by the edge detection circuitry 205. The block 306, further detailed in FIG. 9, contains instructions on how the edge analysis circuitry 210 considers the suitability of an edge and a corresponding vehicle path generated from the edge. Each edge of the boundary, as determined by the edge detection circuitry 205, is assigned a suitability score based on the analysis of the edge analysis circuitry 210. The edges are then ranked from most suitable to least suitable and presented for user selection.

The example machine-readable instructions and/or the example operations 300 of FIG. 3 continue at block 308, at which an edge is selected based on a user input. The edges of the boundary are presented to the user via the path visualization circuitry 230 in order of suitability. Ordered thusly, the edges that a user is most likely to select are near the top of a listing of edges. This enables a user to select an edge in less time than if the user had to search through the listing for the edge. Furthermore, a partial listing of edges may be used for boundaries with many edges to simplify the presentation of edges allowing for easy selection of an edge without requiring the user to consider multiple pages of edges.

The example machine-readable instructions and/or the example operations 300 of FIG. 3 continue at block 310, at which the user accepts the detected field edge as correct. The path visualization circuitry 230 presents the selected edge to the user to receive an acceptability input. If the edge selected in block 308 is acceptable to the user, the operation continues to block 314. If the selected edge is not acceptable, the user may modify the edge per block 312. While edges are automatically detected by the edge detection circuitry 205, the user may choose to modify the edges. As vehicle paths are generated considering an entire edge, the vehicle paths may be modified by modifying endpoints (e.g., a start point and an end point) of the edge. In this way, a portion of the edge can be chosen by the user. In some examples, editing the endpoints of an edge can remove non-linear or irregular portions of the edge for a more representative vehicle path.

The example machine-readable instructions and/or the example operations 300 of FIG. 3 continue at block 312, at which the edge adjustment circuitry 220 operates to modify edge endpoints of the user selected edge from block 308. The block 312, further detailed in FIG. 19, directs the edge adjustment circuitry 220 in conjunction with the path visualization circuitry 230 to accept user input to modify the endpoints (e.g., a start point or an end point) to redefine a selected edge. Once modified, the selected edge is later used to generate a vehicle path.

The example machine-readable instructions and/or the example operations 300 of FIG. 3 continue at block 314, at which the path generation circuitry 215 operates to create a vehicle path based on a selected edge. The block 314, further detailed in FIG. 10, contains instructions that create vehicle paths based on boundary data, the selected edge, and offsets provided by the vehicle offset circuitry 225. The vehicle path contains all tracks that an automated vehicle will operate around, including headland tracks adjacent to a perimeter of a boundary.

The example machine-readable instructions and/or the example operations 300 of FIG. 3 concludes at block 316, at which the vehicle path generation server 105 operates to send a vehicle path to the controller 115 of automated vehicle 110. The block 316, further detailed in FIG. 23, additionally contains instructions to adjust guidance tracks using path generation circuitry 215 based on user input received from the vehicle offset circuitry 225 via the path visualization circuitry 230. After any adjustment is made by the user, the block 316 instructs the automated vehicle to operate along the vehicle path.

Figure 4:
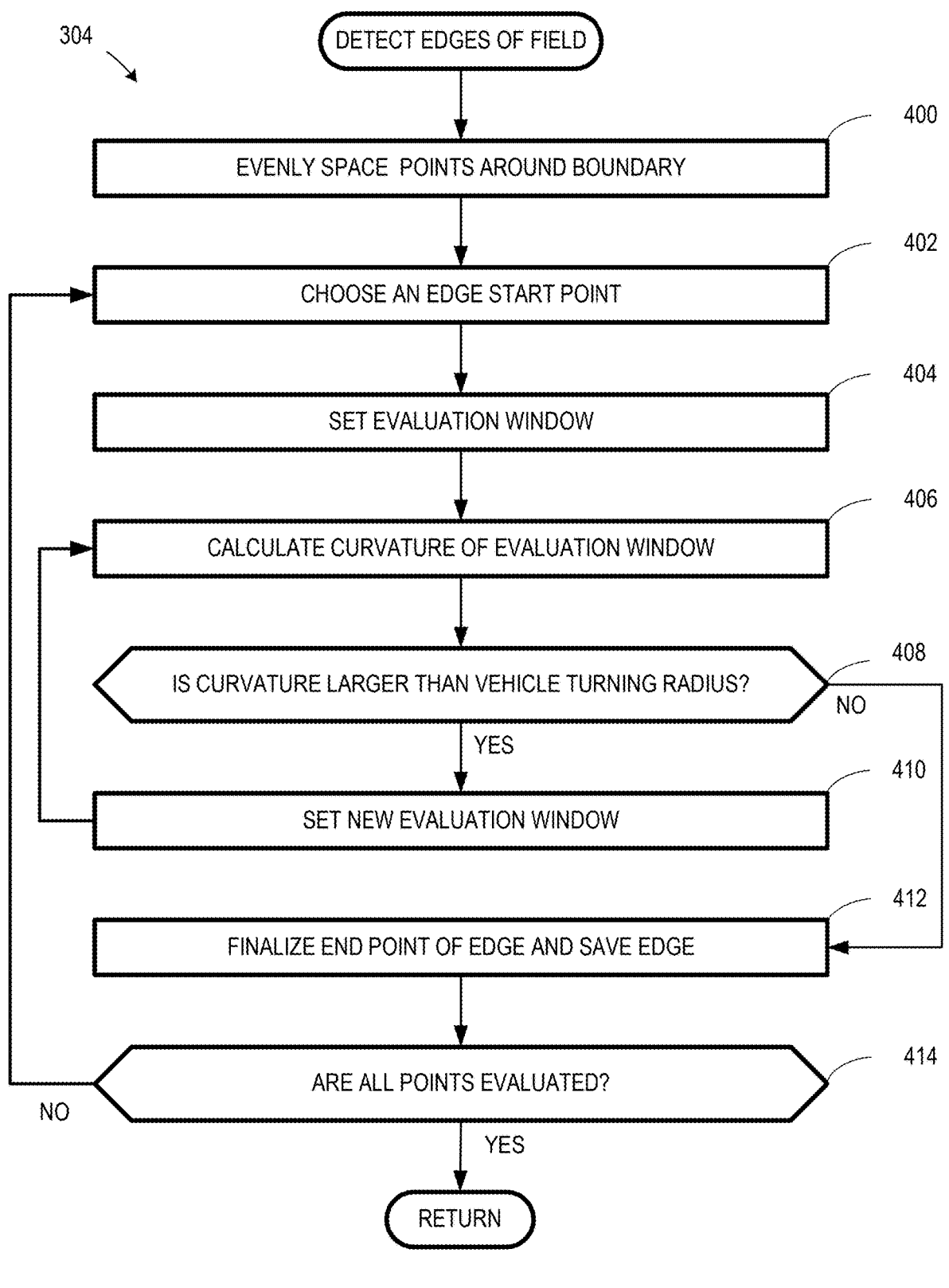
FIG. 4 is a flowchart representative of example machine readable instructions and/or example operations that may be executed, instantiated, and/or performed by example programmable circuitry to implement the detect edges of field operation of FIG. 3.

FIG. 4 is a flowchart representative of example machine readable instructions and/or example operations 304 that may be executed, instantiated, and/or performed by programmable circuitry to detect edges within boundary data. The example machine-readable instructions and/or the example operations 304 of FIG. 4 begin at block 400, at which the edge detection circuitry 205 evenly spaces points through a boundary. As the exact form of the boundary data may vary (e.g., a collection of points, lines with lengths, curves with radii and lengths, etc.), the edge detection circuitry 205 divides the boundary data into a series of equidistant points for further evaluation. In some examples, the distance between points is based on a predetermined value. In other examples, the distance between points can vary based on vehicle data from the vehicle database 240. The operation continues in block 402 by choosing a start point for edge detection. The start point need not be a start point of an edge, as edges have not yet been detected, but rather the start point marks a beginning point of the edge detection. Once an edge start point has been chosen, the operation continues in block 404 by setting an evaluation window. The evaluation window is a number of consecutive points used to calculate a curvature (e.g., radius). The evaluation window must contain a minimum of three consecutive points in order to calculate a radius. In some examples, the edge detection circuitry 205 sets a larger evaluation window to speed up processing. In some examples, the evaluation window can change based on the prior evaluations made. The detect field edges operation 304 continues at block 406 with calculating the curvature of the evaluation window. The edge detection circuitry 205 performs a curvature calculation based on the points within the evaluation window. In some examples, the curvature is calculated from a best fit arc of the points within the evaluation window. At block 408, the calculated curvature is compared to a threshold curvature. If the calculated curvature is less than the threshold curvature, the edge has ended. In some examples, the threshold curvature is a turning radius of a vehicle. The edge detection circuitry 205 can access turning radius data relating to the automated vehicle 110 from the vehicle database 240. In other examples, the threshold curvature is another value representing a substantially straight line. In other words, if a vehicle must maneuver beyond simple adjustments in order to continue on a boundary, it has entered a new edge of the boundary.

Figure 5:
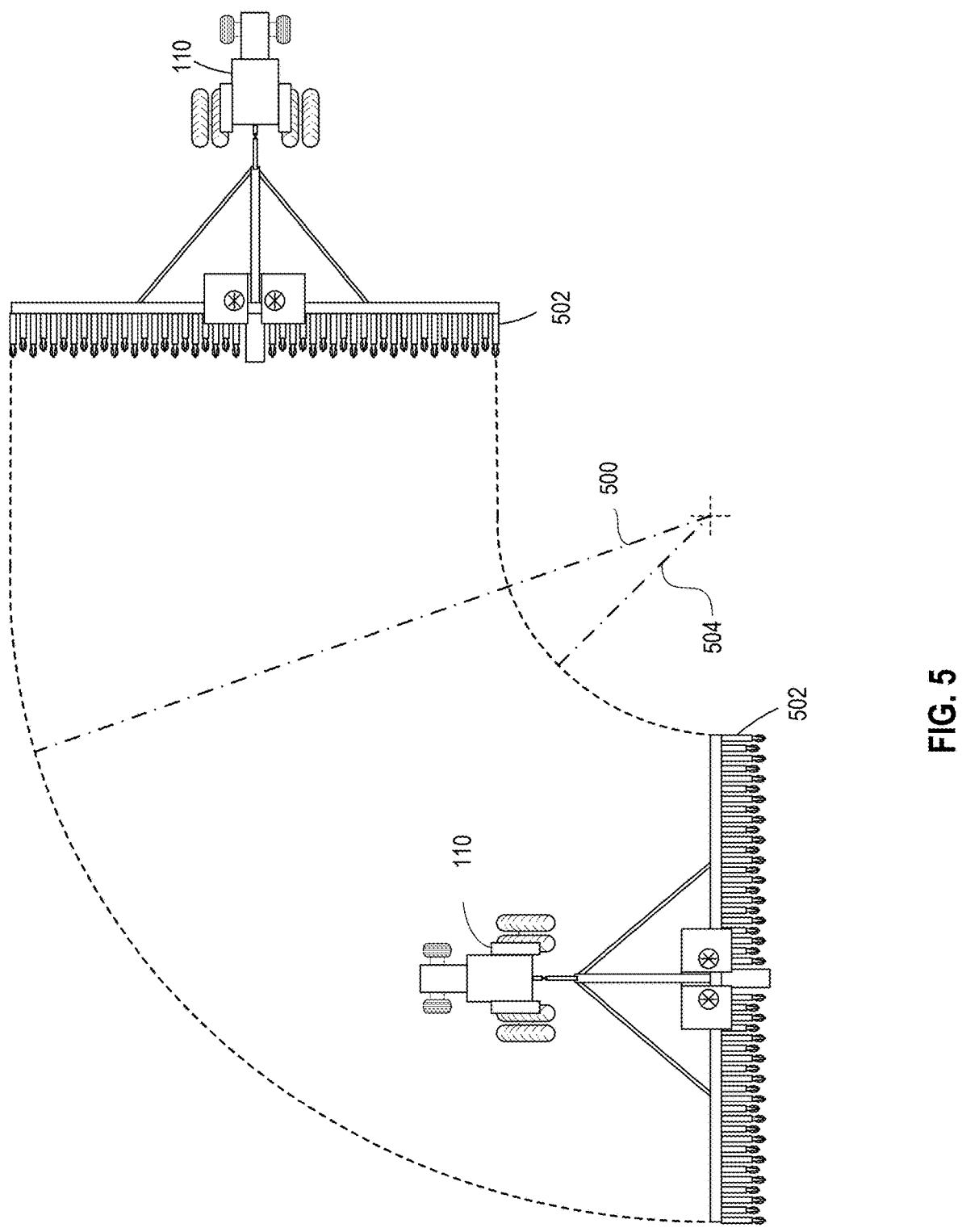
FIG. 5 illustrates the example automated vehicle of FIG. 1 turning with an example turning radius.

FIG. 5 illustrates the example automated vehicle 110 of FIG. 1 turning with an example turning radius 500. In some examples, the turning radius 500 is used by the edge detection circuitry 205 to determine a threshold curvature. The automated vehicle 110 of FIG. 5 is towing a working implement 502. In other examples, the working implement 502 is attached to the automated vehicle 110 directly. The working implement 502 is a tool that performs the work of the automated vehicle 110, as such the turning radius 500 is reflective of the effective turning radius of the working implement 502. The turning radius 500 may therefore be different than the turning radius of the automated vehicle 110. In some examples, the turning radius 500 is an outer turning radius. In other examples, the inner turning radius 504 is used as the threshold curvature for the edge detection circuitry 205. In other examples, an effective turning radius between turning radius 500 and inner turning radius 504 is used as the threshold curvature.

Figure 6:
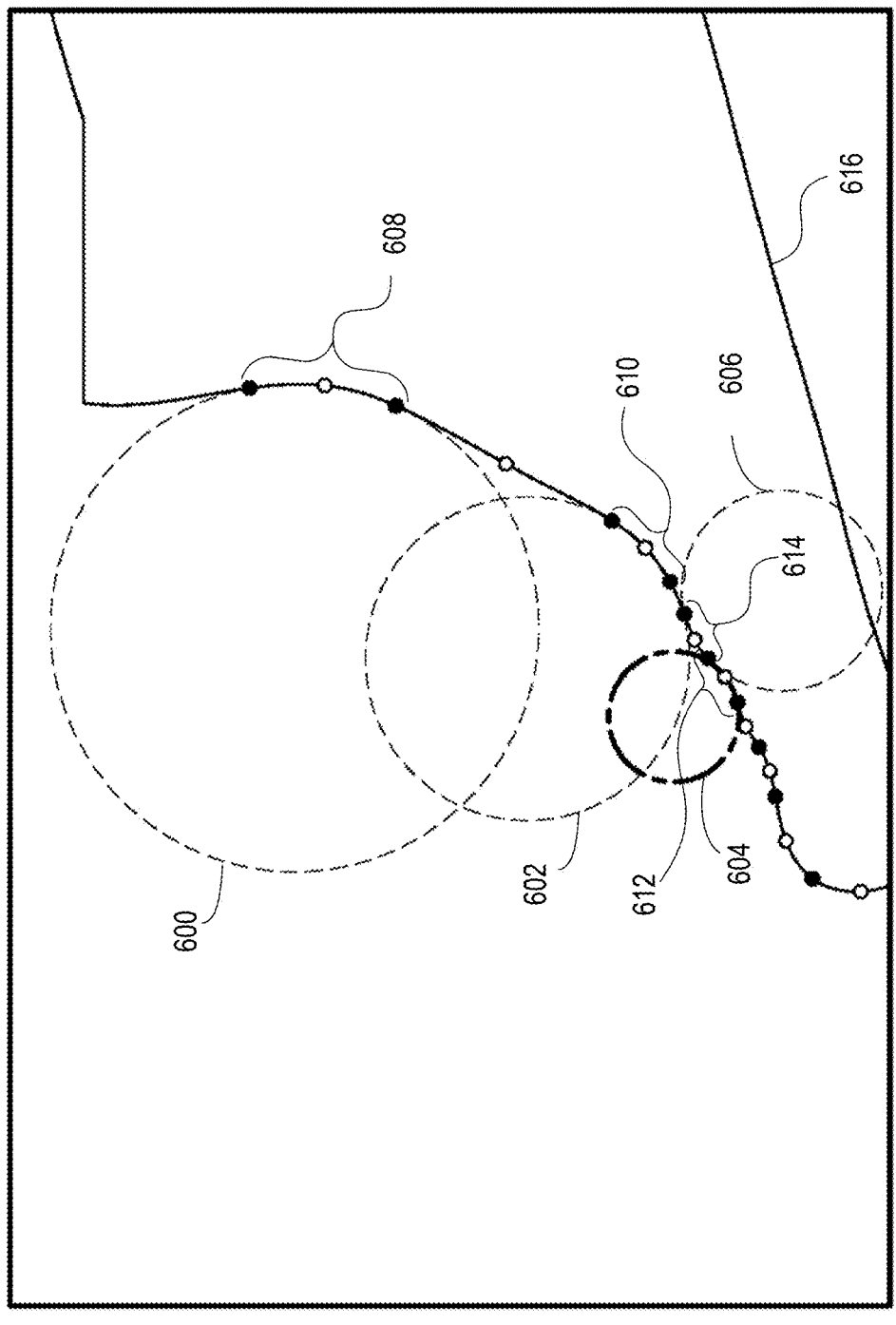
FIG. 6 illustrates example curvature measurements that may be used to implement the calculate curvature of evaluation window operation of FIG. 4.

FIG. 6 illustrates example curvature measurements 600, 602, 604, and 606 that may be used to implement the calculate curvature of evaluation window operation 406 of FIG. 4. The curvature measurements 600, 602, 604, and 606 are based on their corresponding example evaluation windows 608, 610, 612, and 614. In the example calculations of FIG. 6, curvature measurements 600, 602, and 606 are above the curvature threshold, but curvature measurement 604 is below the curvature threshold. Therefore, a point within evaluation window 612 would mark an endpoint of an edge and a start point of a subsequent edge. While FIG. 6 illustrates some example curvature calculations, the edge detection circuitry 205 performs curvature calculations as described in FIG. 4 across all points of an example boundary 616.

Figure 7:
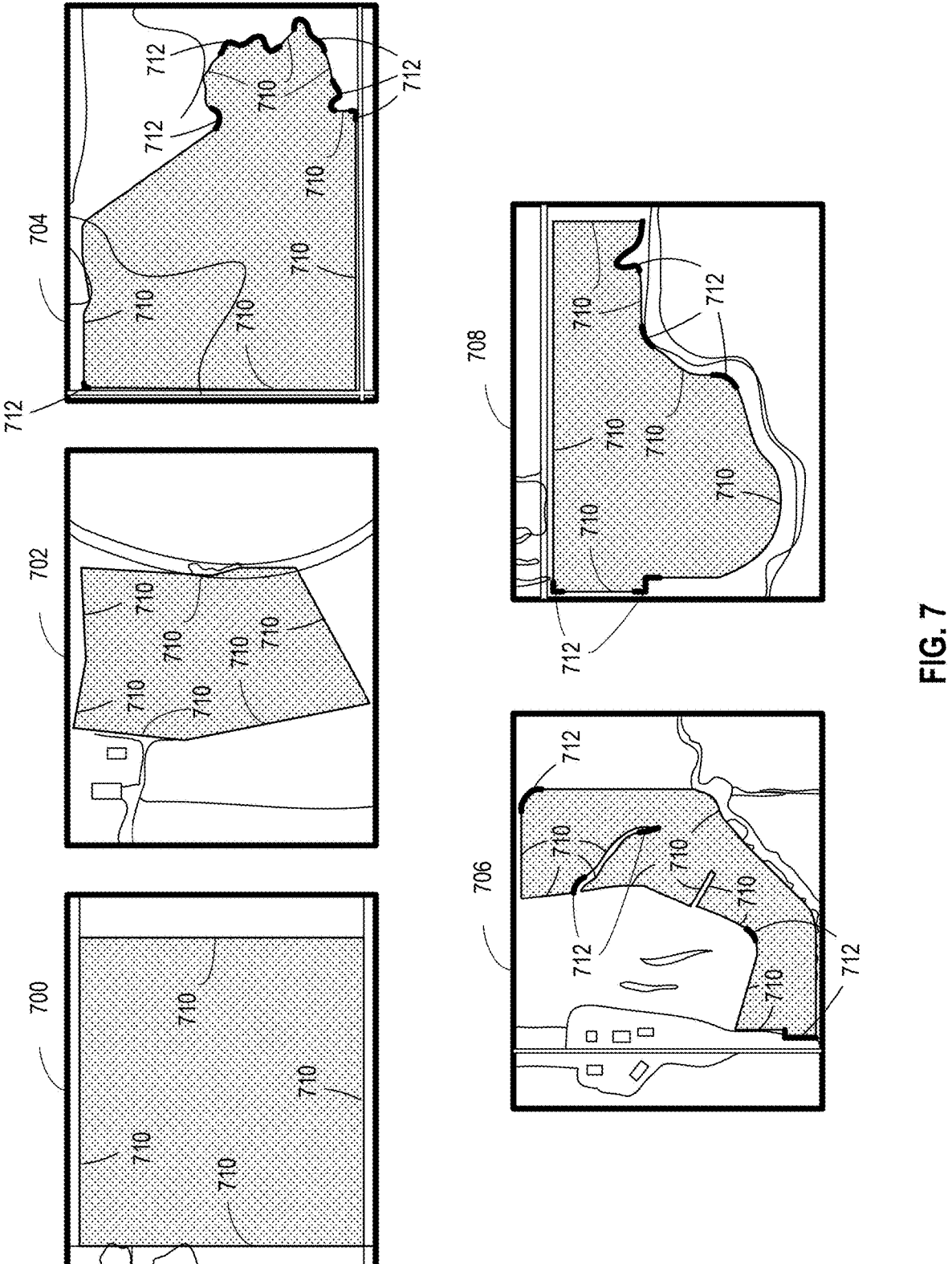
FIG. 7 illustrates example fields where example edges are detected based on the edges having a threshold straightness.

FIG. 7 illustrates example fields 700, 702, 704, 706, 708 where example edges 710 are detected based on the edges having a threshold straightness. Example curved edges 712 have curvatures that fall below a threshold straightness. The curved edges 712 are highlighted with thicker lines, which can be seen on example fields 704, 706, and 708.

Figure 8:
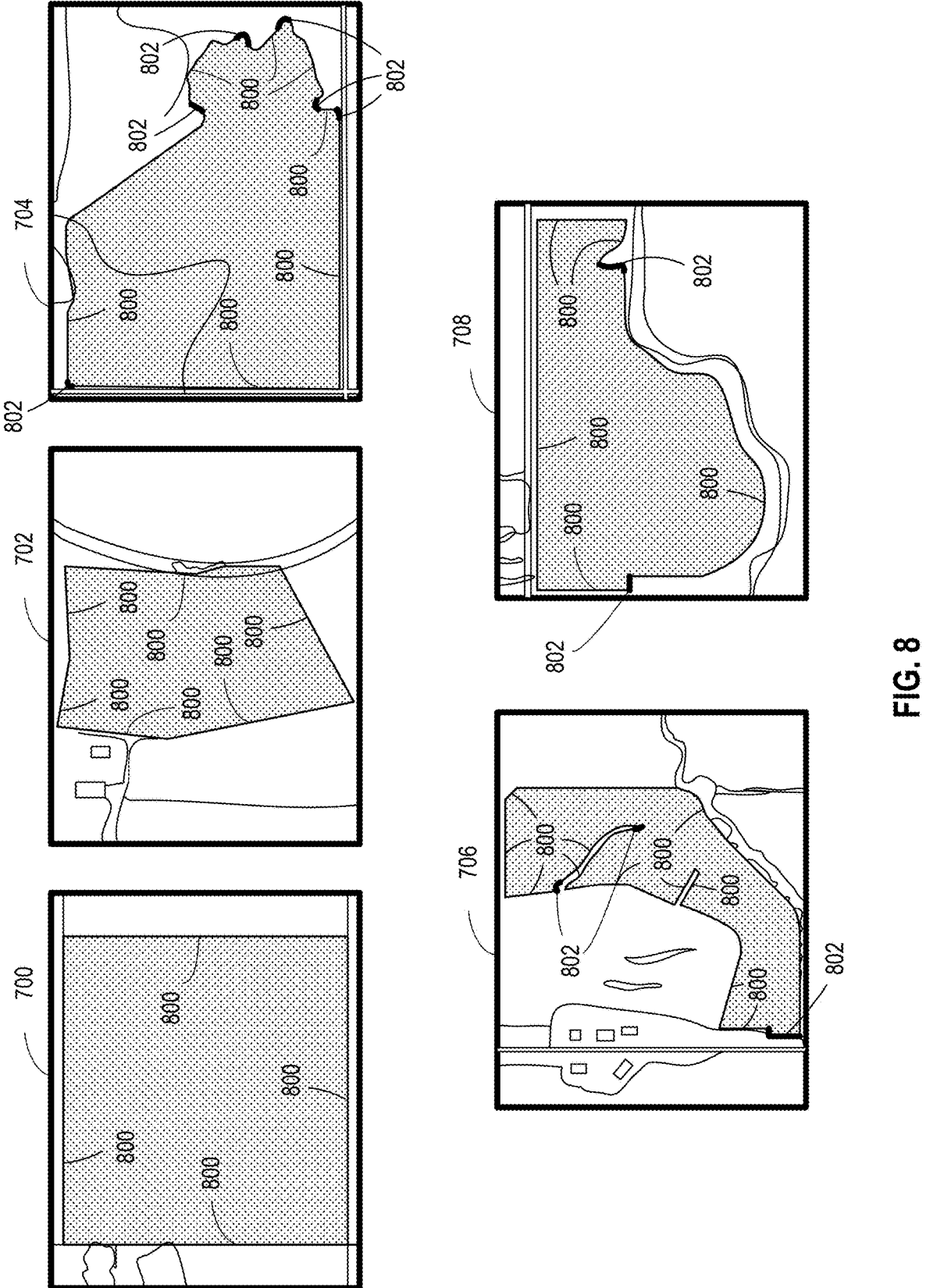
FIG. 8 illustrates the example fields of FIG. 7 wherein the edges are detected based on having a curvature greater than the example turning radius of FIG. 5.

FIG. 8 illustrates the example fields 700, 702, 704, 706, 708 of FIG. 7 wherein edges 800 are detected based on having a curvature greater than the example turning radius 500 of FIG. 5. Example curved edges 802 have curvatures that fall below a threshold curvature corresponding with an example turning radius of an example vehicle (e.g., turning radius 500, inner turning radius 504). The curved edges 802 are highlighted with thicker lines, which can be seen on example fields 704, 706, and 708. The curved edges 802 are smaller and fewer in number than the corresponding curved edges 712 of FIG. 7.

Returning to FIG. 4, block 408 directs the edge detection circuitry 205 to evaluate an evaluation window compared to a curvature threshold. In some examples, the curvature threshold is a turning radius of the vehicle. If the evaluation window is larger than or equal to the curvature threshold (e.g., vehicle turning radius), the operation proceeds to block 410. Block 410 directs the edge detection circuitry 205 to define a new evaluation window. The new evaluation window contains at least one additional sequential point of the boundary. The operation then returns to block 406 to repeat evaluating the curvature of the evaluation window. If the curvature of the evaluation window is found to be less than the curvature threshold (e.g., vehicle turning radius), the edge detection circuitry 205 proceeds to block 412. At block 412, the endpoint of the edge is finalized at the point where curvature has fallen below the threshold curvature. In some examples, a low curvature radius represents a corner between two edges. The operation then continues with block 414, at which the edge detection circuitry 205 determines if all points of the boundary are evaluated. If more points remain in the boundary, the operation returns to block 402 to detect a subsequent edge. If all points are evaluated, the operation is completed. In some examples, the edge detection circuitry 205 determines that all points are evaluated by determining if the most recent edge detected contains an endpoint of a previous edge. In this case, the most recent edge replaces the edge with an endpoint contained within the most recent edge. Thus, if the first chosen start point from block 402 was not the true start point of an edge, it would be overwritten by the start point of the most recent edge.

Figure 9:
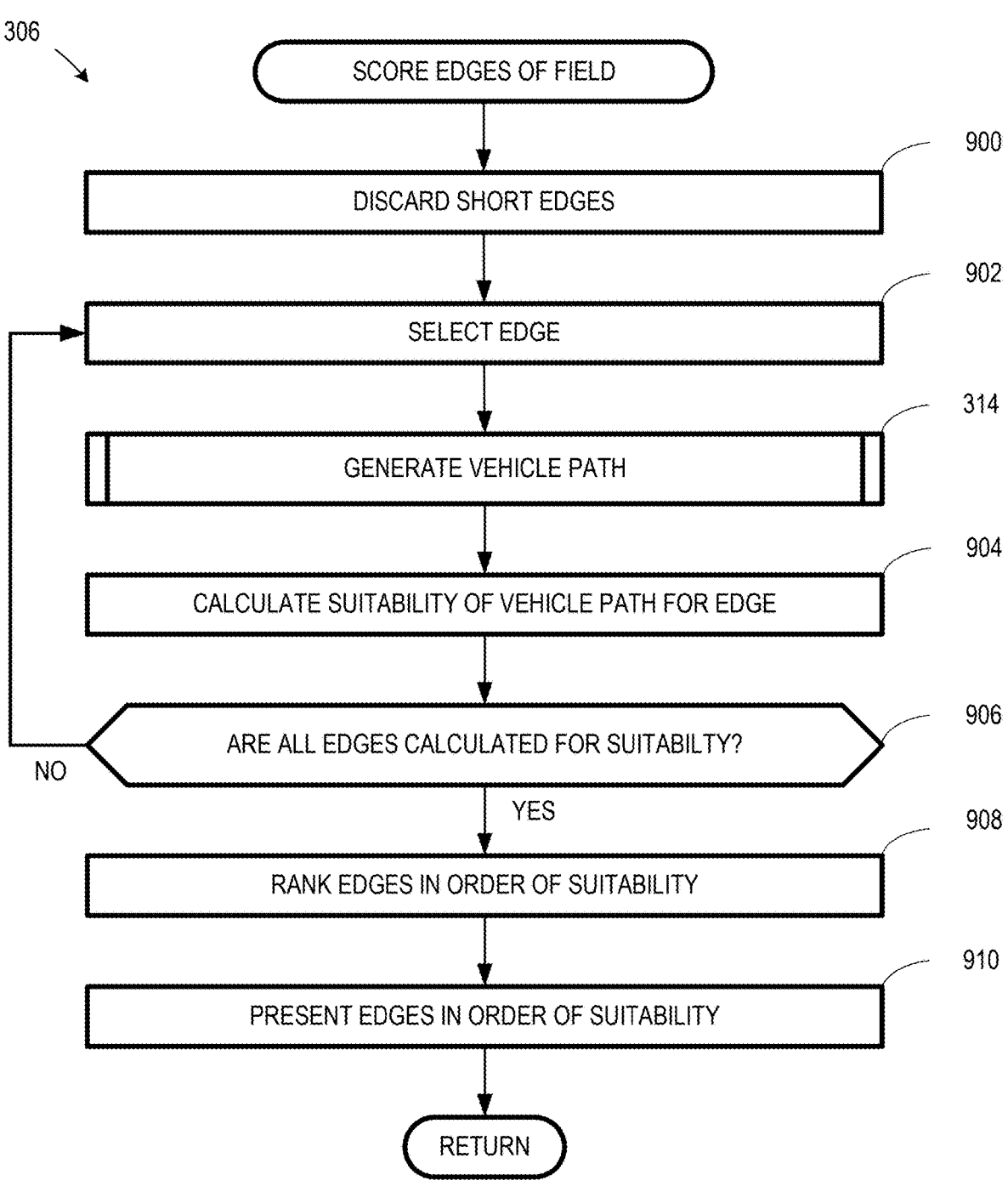
FIG. 9 is a flowchart representative of example machine readable instructions and/or example operations that may be executed, instantiated, and/or performed by example programmable circuitry to implement the score edges of field operation of FIG. 3.

FIG. 9 is a flowchart representative of example machine readable instructions and/or example operations 306 that may be executed, instantiated, and/or performed by programmable circuitry to score edges for suitability. The example machine-readable instructions and/or the example operations 306 of FIG. 9 begin at block 900, at which edge analysis circuitry 210 discards short edges. Short edges are edges with a length below a threshold length for usability. For example, boundaries with highly irregular portions (e.g., boundaries following meandering bodies of water) may contain a plurality of very short and highly curved edges that are not representative of, nor similar to, the surrounding edges. These short edges are unlikely to be used as the basis for a vehicle path, thus they are discarded to speed up processing time. In some examples, the length of an edge is a geographic measure (e.g., feet, meters, etc.). In other examples, the length of an edge is a total number of location points (e.g., the points assigned to the boundary through the operations of FIG. 4) contained within the edge.

Figure 18:
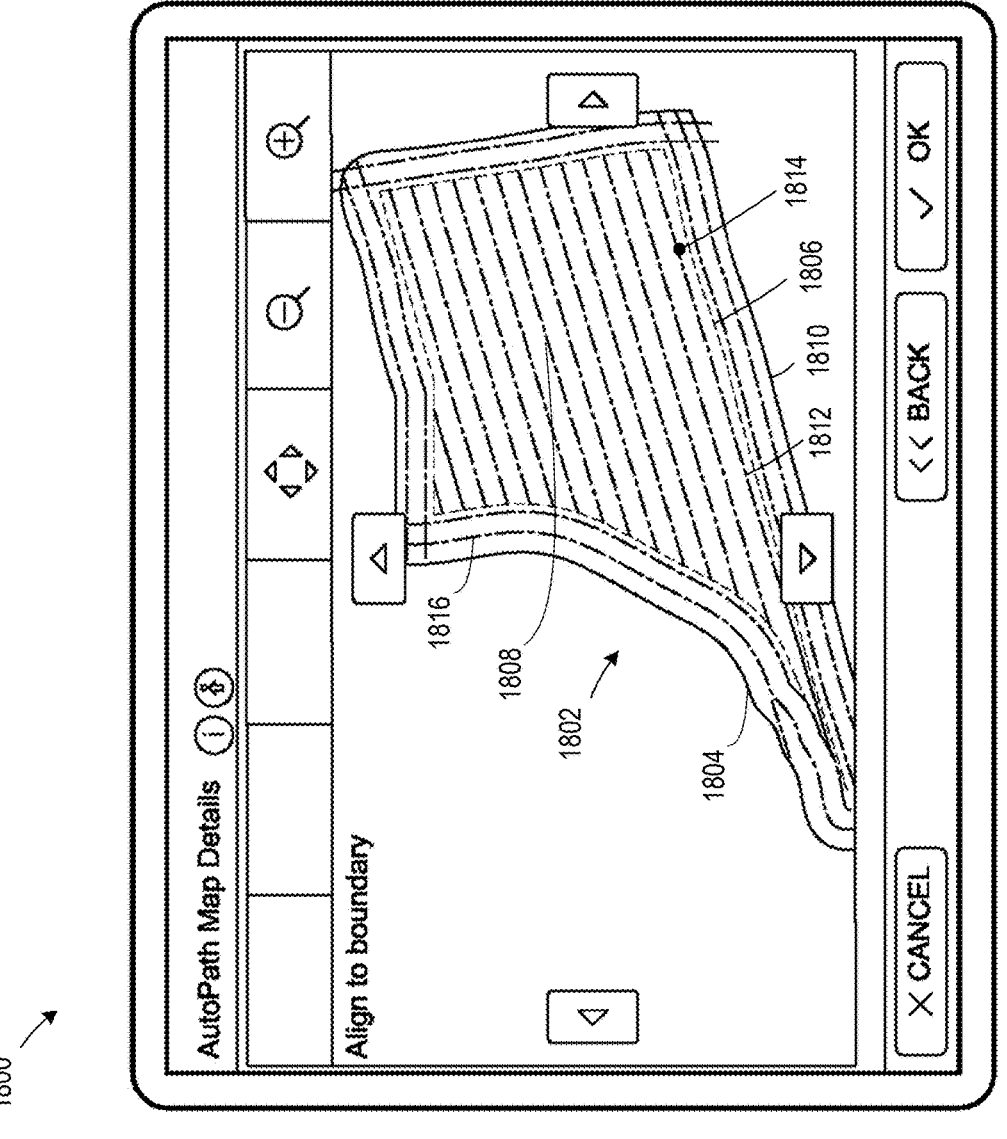

The example machine-readable instructions and/or the example operations 306 of FIG. 9 continues at block 902, at which edge analysis circuitry 210 selects an edge to analyze for suitability. The operation continues at block 314, at which edge analysis circuitry 210 directs path generation circuitry 215 to generate a vehicle path for the selected edge. Block 314, further detailed in FIG. 10, contains instructions for the path generation circuitry 215 to generate a vehicle path to fully cover the target field (as shown in FIG. 18). Once the vehicle path is created, the operation continues at block 904, at which the edge analysis circuitry 210 calculates the suitability of the vehicle path for the selected edge. Suitability of the vehicle path represents how useful the vehicle path is for working within the boundary. In some examples, suitability is based on the selected edge (e.g., a length of the edge, a straightness of the edge, etc.). In other examples, the suitability is based on an efficiency (e.g., a total drive time, a total driven length, a total turning time, etc.) of the vehicle path generated based on the selected edge. In other words, the suitability of the vehicle path can reflect an amount of total time a vehicle spends on the vehicle path, a number of turns in the vehicle path, and/or an amount of time spent turning on the vehicle path. In some examples, the edge analysis circuitry 210 calculates a single suitability measure. In other examples, the edge analysis circuitry 210 calculates multiple suitability measures and combines them into a single suitability score.

The example machine-readable instructions and/or the example operations 306 of FIG. 9 continues at block 906, at which edge analysis circuitry 210 determines if all edges have been calculated for suitability. If not all of the edges have been calculated for suitability, the operation returns to block 902 to calculate suitability for a new edge. Once all of the edges have been calculated for suitability, block 906 directs edge analysis circuitry 210 to continue to block 908. At block 908, the edge analysis circuitry 210 ranks the edges in order of suitability from most suitable to least suitable. The operation 306 continues at block 910, at which the ranked edges are presented by the path visualization circuitry 230 to the user in order of suitability.

Figure 10:
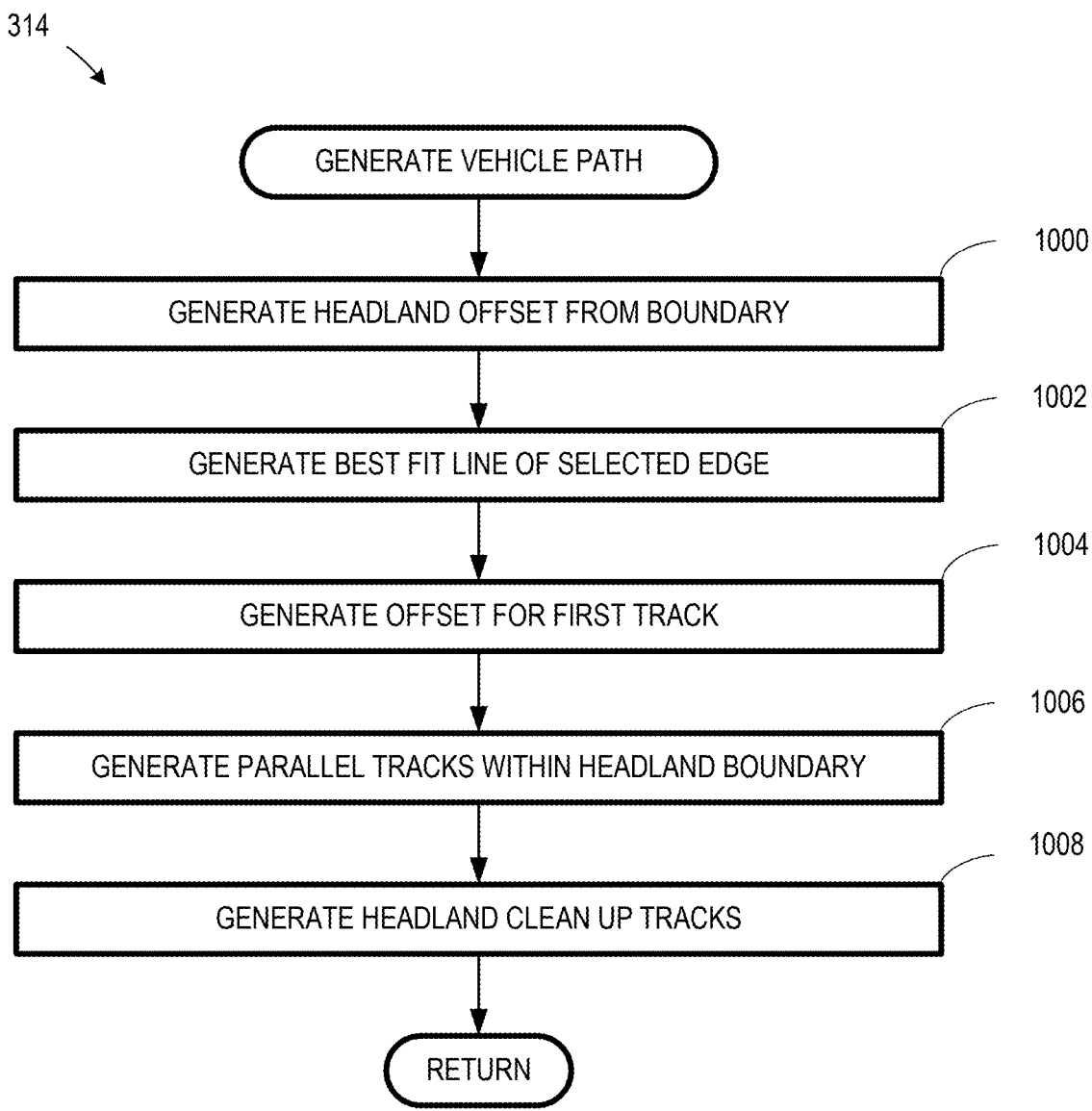
FIG. 10 is a flowchart representative of example machine readable instructions and/or example operations that may be executed, instantiated, and/or performed by example programmable circuitry to implement the generate vehicle path operation of FIGS. 3 and 9.
Figure 13:
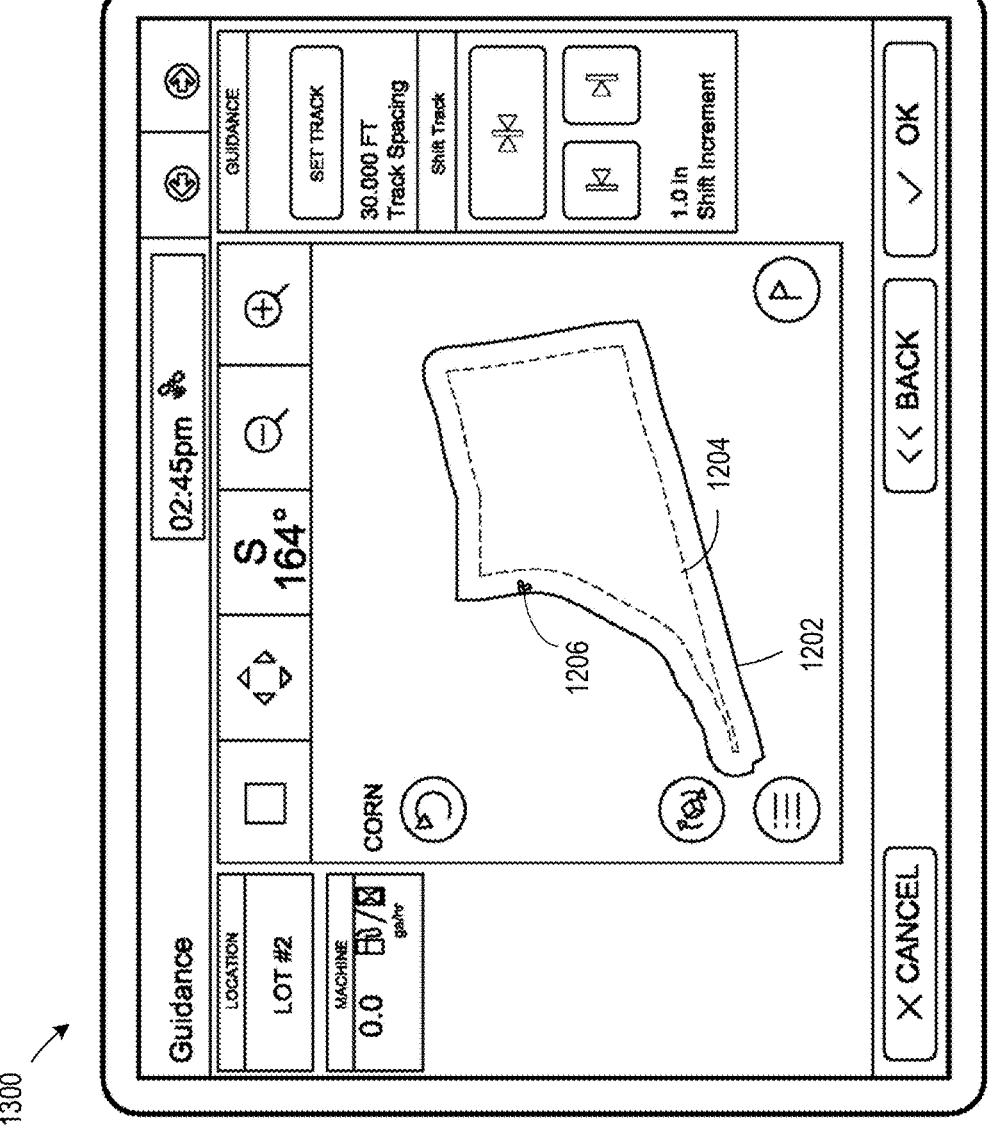

FIG. 10 is a flowchart representative of example machine readable instructions and/or example operations 314 that may be executed, instantiated, and/or performed by programmable circuitry to generate automated vehicle paths. The example machine-readable instructions and/or the example operations 314 of FIG. 10 begin at block 1000, at which the path generation circuitry 215 is directed to generate a headland offset from the boundary. The headland offset, illustrated in FIG. 13, is offset from boundary toward the center of the field at a constant width following the contours of the boundary. In some examples, the width of the headland offset is set by the user. In other examples, the width of the headland offset is a multiple of the working width of the vehicle provided by the vehicle offset circuitry 225. The headland offset divides space in the field to allow an automated vehicle to turn, reposition, or otherwise maneuver from one track to another track within the vehicle path. In this way, the portions of the vehicle path within the headland offset (e.g., the guidance tracks, tracks, passes, etc.) can be straight lines without regard to the geometry of the boundary.

The operation 314 continues with block 1002, at which the path generation circuitry 215 generates a best fit line of the selected edge. In some examples, the best fit line is a straight line that most closely follows the position and angle of the selected edge (detailed in FIGS. 15-17). In some examples, the best fit line is a straight line between a start point and an end point of the selected edge. In other examples, the best fit line is a curve (e.g., a best fit curve) that most closely follows the position and contours of the selected edge (illustrated in FIG. 17A). The best fit line will serve as the basis for the tracks within the headland offset.

The operation 314 continues with block 1004, at which the path generation circuitry 215 generates an offset for a first track. Guidance tracks are based on (e.g., substantially parallel to) the best fit line of the selected edge. The offset for the first track is a point which intersects with the first track, to position the first track relative to the boundary. In some examples, the first track offset is determined by finding a point of the selected edge that is closest to the center of the field and determining how far from the best fit line of the selected edge the point is. The track offset is then defined as a distance from the point, as measured from the best fit line of the selected edge. In this case, the track offset is the width of the headland offset added to half of the working width of the agricultural vehicle. In some examples, the first track offset is determined by locating the longest possible track (e.g., longest possible straight line operation) substantially parallel to the best fit line of the selected edge that allows the width of the working element to remain within the headland offset. In other examples, the first track offset is received from the vehicle offset circuitry 225 and is based on a current location of the vehicle received by the vehicle offset circuitry 225. Once the first track offset is generated, the operation continues to block 1006, at which the path generation circuitry 215 generates parallel tracks within the headland offset. The parallel tracks are spaced apart based on a working width of the vehicle obtained from the vehicle offset circuitry 225 and are substantially parallel to each other. At least one track of the parallel tracks intersects with the first track offset from block 1004.

The operation 314 concludes with block 1008, at which the path generation circuitry 215 generates headland clean up tracks. The headland cleanup tracks are positioned between the boundary and the headland offset and run offset from the boundary. The headland cleanup tracks allow the working implement of the vehicle to operate on any portion of the field that was missed as the vehicle maneuvered between the guidance tracks. The headland cleanup tracks additionally allow the working implement of the vehicle to work up to the edges of the boundary. Once the headland cleanup tracks are generated, the operation 314 is completed and the vehicle path is fully generated.

Figure 11:
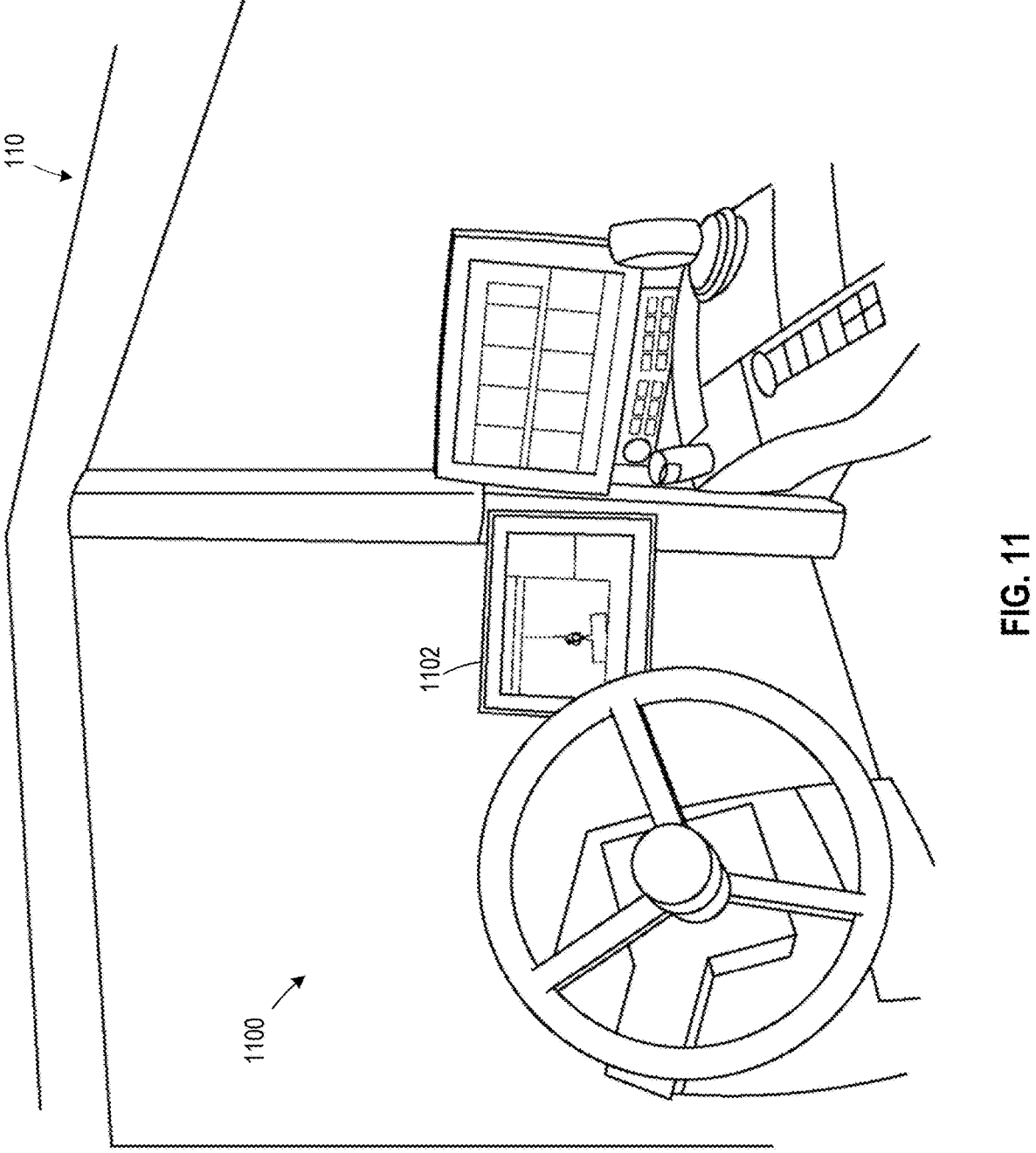
FIG. 11 illustrates an example interior of the example automated vehicle of FIG. 1 including an example user interface device to receive user inputs into the vehicle path generation server of FIG. 1.

FIG. 11 illustrates an example interior 1100 of the example automated vehicle 110 of FIG. 1, including an example user interface device 1102 to receive user inputs into the vehicle path generation server 105 of FIG. 1. The controller 115 of FIG. 1 communicates with the user interface device 1102 (e.g., a vehicle mounted touch screen) through the touch screen circuitry 140. The user interface receives images (e.g., screens, displays, etc.) from the path visualization circuitry 230. In some examples, the user interface device 1102 includes a touch screen. The user interface device 1102 accepts user inputs as needed in the operations of at least FIGS. 3, 19, and 23.

Figure 12:
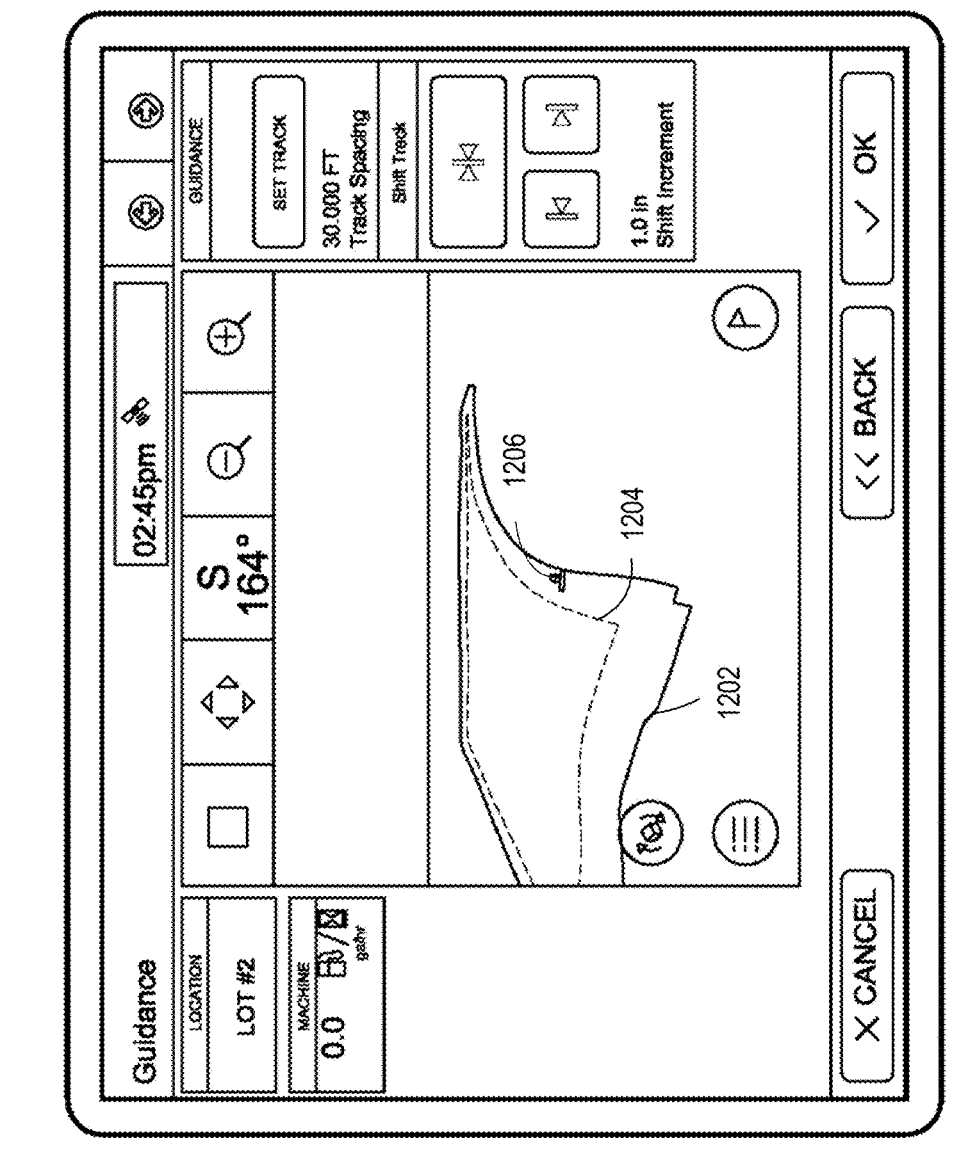
FIGS. 12-18 illustrate example displays of the user interface device of FIG. 11 as the vehicle path generation server executes the example machine readable instructions of FIGS. 3, 4, 9, and 10.

FIGS. 12-18 illustrate example displays of the user interface device 1102 of FIG. 11 as the vehicle path generation server 105 executes the example machine readable instructions of at least FIGS. 3, 4, 9, and 10. In some examples, the displays are generated by the path visualization circuitry 230. FIG. 12 is an example display 1200 of the user interface device 1102 as the automated vehicle 110 is being manually operated. The display 1200 includes an example boundary 1202 and an example headland offset 1204. The display further includes an example vehicle icon 1206 that represents the location of the automated vehicle 110 as determined by the GPS circuitry 135 of the controller 115. In some examples, the boundary 1202 and the headland offset 1204 are generated by the path visualization circuitry 230. In some examples, the boundary 1202 and the headland offset 1204 are recalled from the memory 130 of the controller 115 after being previously received from the path visualization circuitry 230 and stored in the memory 130.

FIG. 13 is an example display 1300 of the user interface device 1102 as the vehicle path generation server 105 executes the example machine readable instructions at block 302 of FIG. 3. The display 1300 includes the boundary 1202, the headland offset 1204, and the vehicle icon 1206. The display 1300 indicates a field has been located and the vehicle path generation server 105 is ready to generate a vehicle path.

Figure 14:
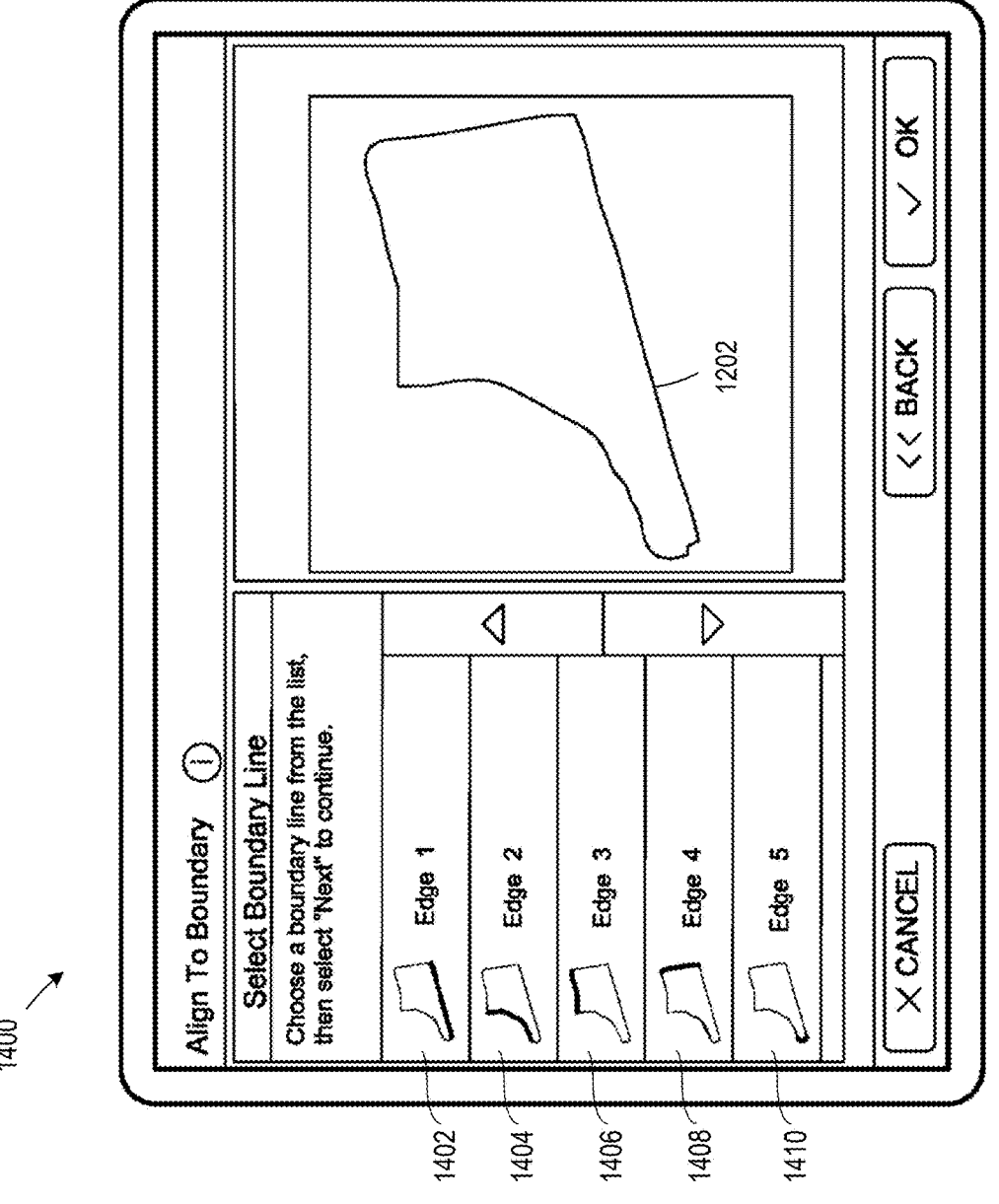

FIG. 14 is an example display 1400 of the user interface device 1102 after the vehicle path generation server 105 executes the example machine readable instructions at block 304, 306, and 308 of FIG. 3, operation 304 of FIG. 4, and operation 306 of FIG. 9. The display 1400 shows the example boundary 1202 and the example edges 1402, 1404, 1406, 1408, and 1410 of the boundary 1202 highlighted. The edges 1402, 1404, 1406, 1408, and 1410 have been ranked in suitability, with a most suitable edge (e.g., the edge 1402) on the top. The user interface device 1102 accepts a user input (e.g., touch input) to select which edge should be used to generate the vehicle path, as described at block 308 of FIG. 3.

Figure 15A:
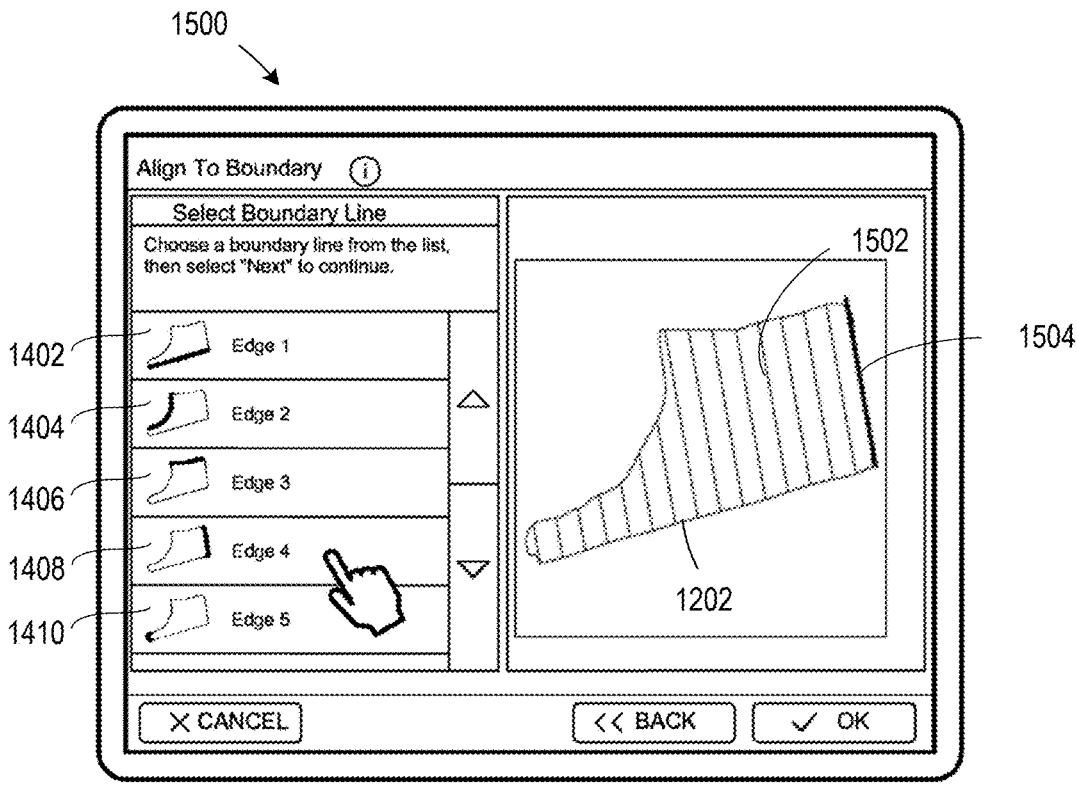

FIG. 15A is an example display 1500 of the user interface device 1102 after the vehicle path generation server 105 executes the example machine readable instructions at block 308 of FIG. 3. The display 1500 shows the example boundary 1202 and the example edges 1402, 1404, 1406, 1408, and 1410 of the boundary 1202 highlighted. The display 1500 indicates that the user has selected the edge 1408 to generate a vehicle path. Example preview tracks 1502 are displayed within the boundary 1202. The preview tracks 1502 are substantially parallel to an example best fit line 1504 of edge 1408.

Figure 15B:
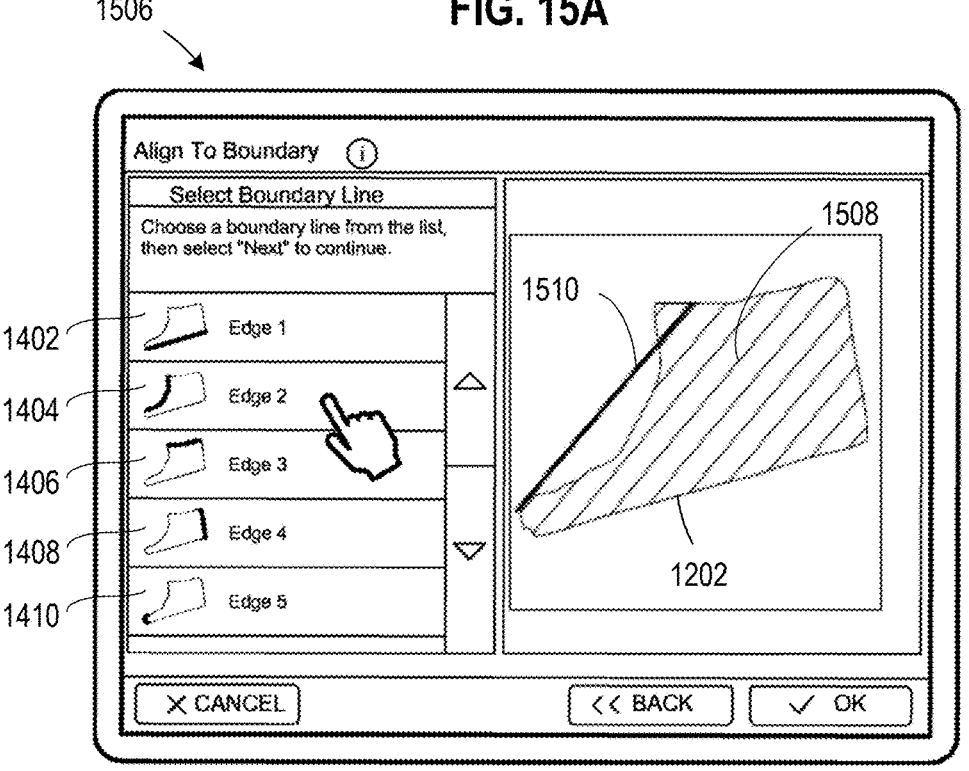

FIG. 15B is an example display 1506 of the user interface device 1102 after the vehicle path generation server 105 executes the example machine readable instructions at block 308 of FIG. 3. The display 1506 shows the example boundary 1202 and the example edges 1402, 1404, 1406, 1408, and 1410 of the boundary 1202 highlighted. The display 1506 indicates that the user has selected the edge 1404 to generate a vehicle path. Example preview tracks 1508 are displayed within the boundary 1202. The preview tracks 1508 are substantially parallel to an example best fit line 1510 of edge 1404.

Figure 16A:
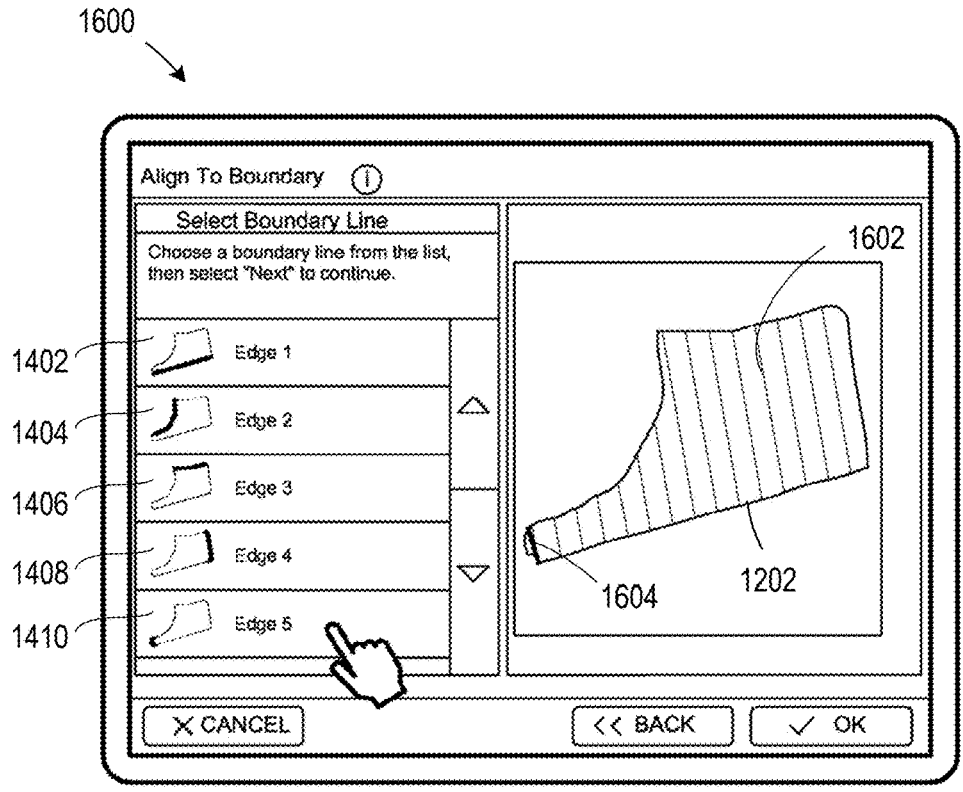

FIG. 16A is an example display 1600 of the user interface device 1102 after the vehicle path generation server 105 executes the example machine readable instructions at block 308 of FIG. 3. The display 1600 shows the example boundary 1202 and the example edges 1402, 1404, 1406, 1408, and 1410 of the boundary 1202 highlighted. The display 1600 indicates that the user has selected the edge 1410 to generate a vehicle path. Example preview tracks 1602 are displayed within the boundary 1202. The preview tracks 1602 are substantially parallel to an example best fit line 1604 of edge 1410.

Figure 16B:
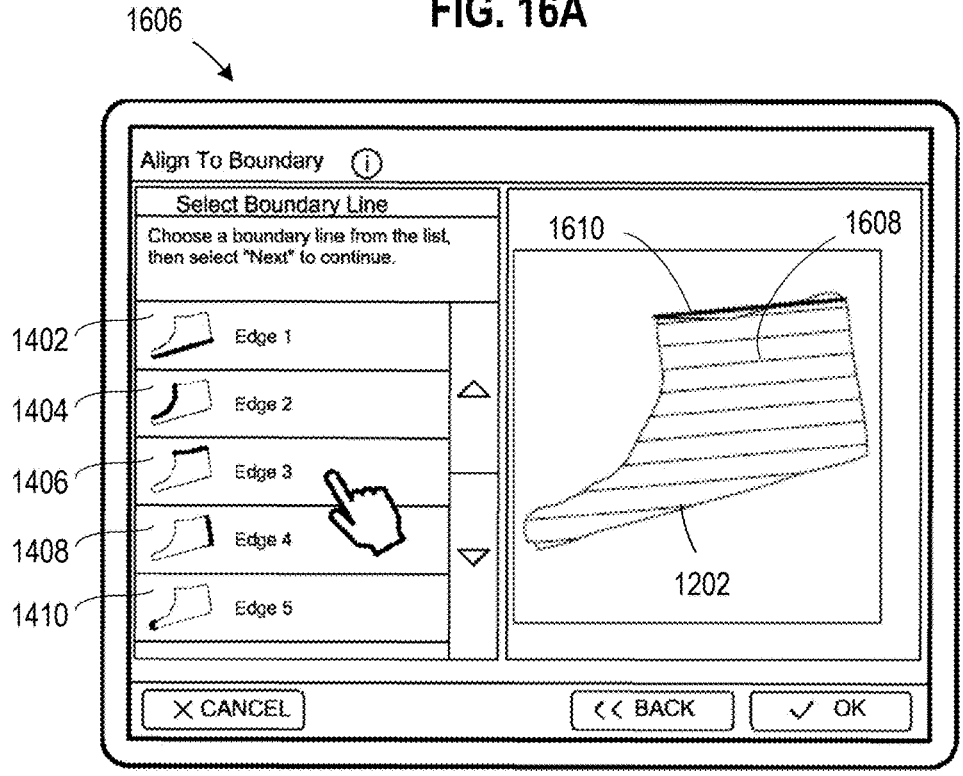

FIG. 16B is an example display 1606 of the user interface device 1102 after the vehicle path generation server 105 executes the example machine readable instructions at block 308 of FIG. 3. The display 1606 shows the example boundary 1202 and the example edges 1402, 1404, 1406, 1408, and 1410 of the boundary 1202 highlighted. The display 1606 indicates that the user has selected the edge 1406 to generate a vehicle path. Example preview tracks 1608 are displayed within the boundary 1202. The preview tracks 1608 are substantially parallel to an example best fit line 1610 of edge 1406.

Figure 17A:
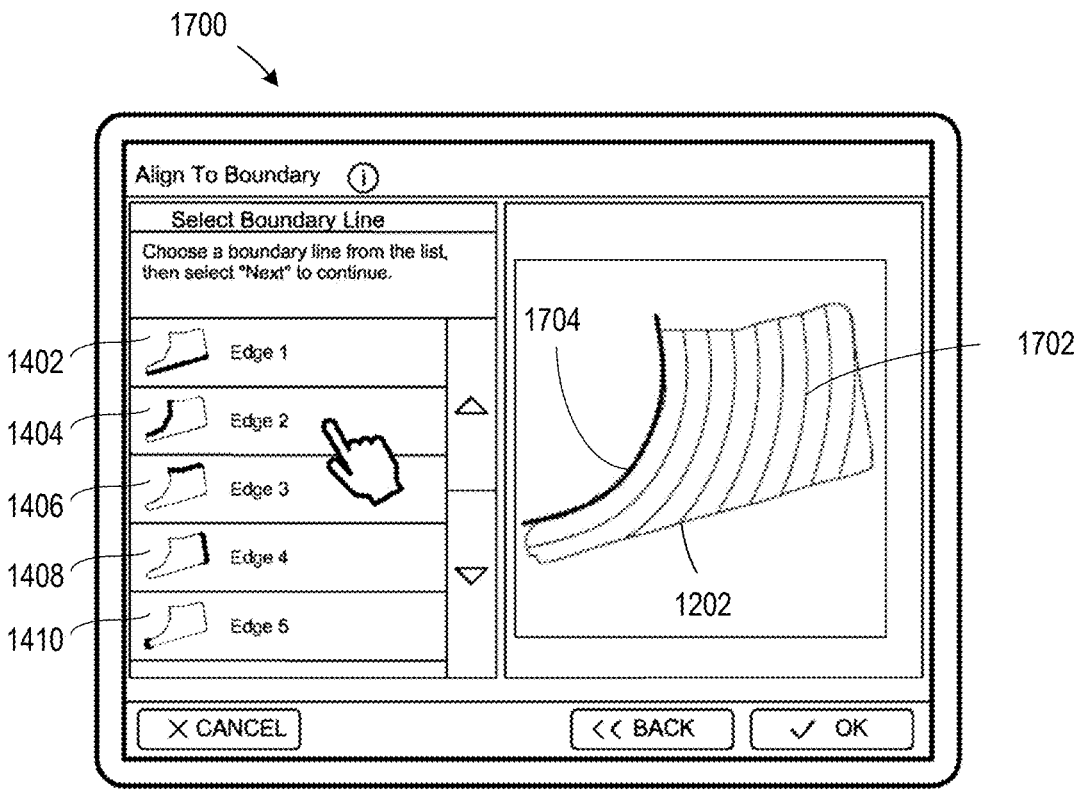

FIG. 17A is an example display 1700 of the user interface device 1102 after the vehicle path generation server 105 executes the example machine readable instructions at block 308 of FIG. 3. The display 1700 shows the example boundary 1202 and the example edges 1402, 1404, 1406, 1408, and 1410 of the boundary 1202 highlighted. The display 1700 indicates that the user has selected the edge 1404 to generate a vehicle path. Example preview tracks 1702 are displayed within the boundary 1202. The preview tracks 1702 are offset from an example best fit curve 1704 of edge 1404. In this example, the vehicle path generation server 105 has been instructed to form tracks that follow the curve of the edge 1404, as shown by the best fit curve 1704 and curved preview tracks 1702.

Figure 17B:
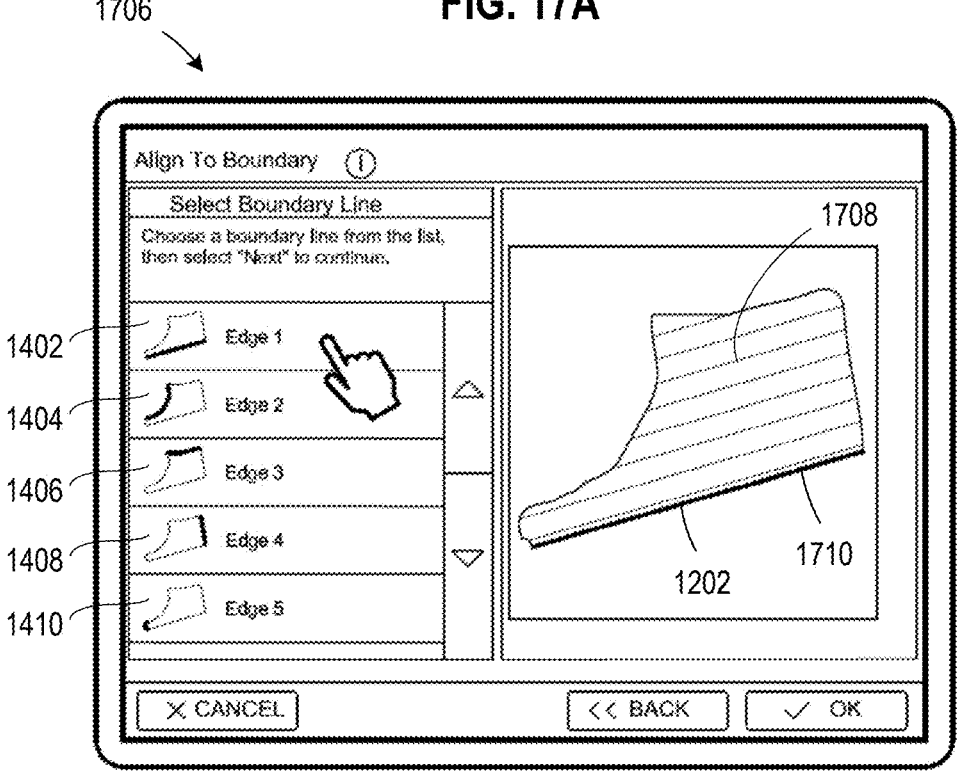

FIG. 17B is an example display 1706 of the user interface device 1102 after the vehicle path generation server 105 executes the example machine readable instructions at block 308 of FIG. 3. The display 1706 shows the example boundary 1202 and the example edges 1402, 1404, 1406, 1408, and 1410 of the boundary 1202 highlighted. The display 1706 indicates that the user has selected the edge 1402 to generate a vehicle path. Example preview tracks 1708 are displayed within the boundary 1202. The preview tracks 1708 are substantially parallel to an example best fit line 1710 of edge 1406.

FIG. 18 is an example display 1800 of the user interface device 1102 after the vehicle path generation server 105 executes the example machine readable instructions at block 314 of FIG. 3 and operation 314 of FIG. 10 to generate a vehicle path. The display 1800 contains an example vehicle path 1802 that covers the area within an example boundary 1804. The vehicle path 1802 is generated by the path generation circuitry 215 according to the machine readable instructions at block 314 of FIG. 3. The display 1800 shows an example headland offset 1806. The headland offset 1806 runs evenly offset from the boundary 1804. The headland offset 1806 is generated by the path generation circuitry 215 according to the machine readable instructions at block 1000 of FIG. 10 and offset data from the vehicle offset circuitry 225. Example tracks 1808 are positioned within the headland offset 1806. The tracks 1808 are substantially parallel to each other and substantially parallel to a best fit line of an example selected edge 1810. The tracks 1808 are generated by the path generation circuitry 215 according to the machine readable instructions at block 1006 of FIG. 10. The tracks 1808 are positioned such that an example first track 1812 intersect with an example first track offset 1814. The first track offset 1814 is generated by the path generation circuitry 215 according to the machine readable instructions at block 1004 of FIG. 10 and offset data from the vehicle offset circuitry 225. The display 1800 contains example headland clean up tracks 1816 that run between the headland offset 1806 and the boundary 1804. The headland clean up tracks 1816 are generated by the path generation circuitry 215 according to the machine readable instructions at block 1008 of FIG. 10.

Figure 19:
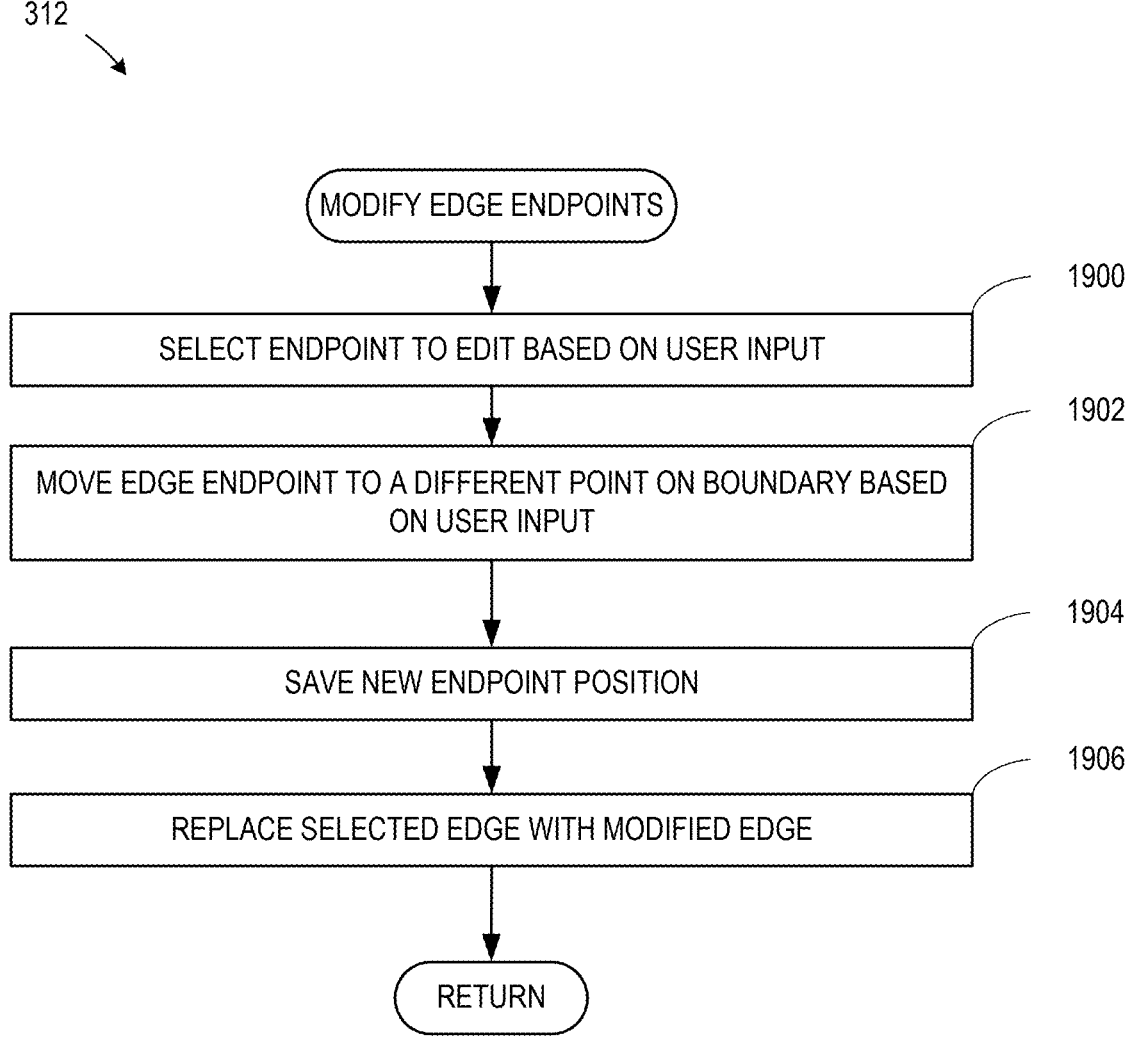
FIG. 19 is a flowchart representative of example machine readable instructions and/or example operations that may be executed, instantiated, and/or performed by example programmable circuitry to implement the modify edge endpoints operation of FIG. 3.

FIG. 19 is a flowchart representative of example machine readable instructions and/or example operations 312 that may be executed, instantiated, and/or performed by programmable circuitry to modify the endpoints of an edge. The example operations 312 of FIG. 19 begin at block 1900, at which the edge adjustment circuitry 220 operates to select an edge endpoint to edit based on user input. The operations 312 continue at block 1902, at which the edge endpoint is moved to a different point along a boundary based on user input. In some examples, the endpoint is moved along the boundary based on a user selected direction. In some examples, the endpoint is indexed a set distance along the boundary each time a user selects a direction. In some examples, the user selects a new position for the endpoint. The operations 312 continue at block 1904, at which the new edge endpoint (e.g., the most recently moved edge endpoint) is saved as the endpoint of the edge. The operations 312 conclude at block 1906, at which the selected edge is replaced by the modified edge.

Figure 20:
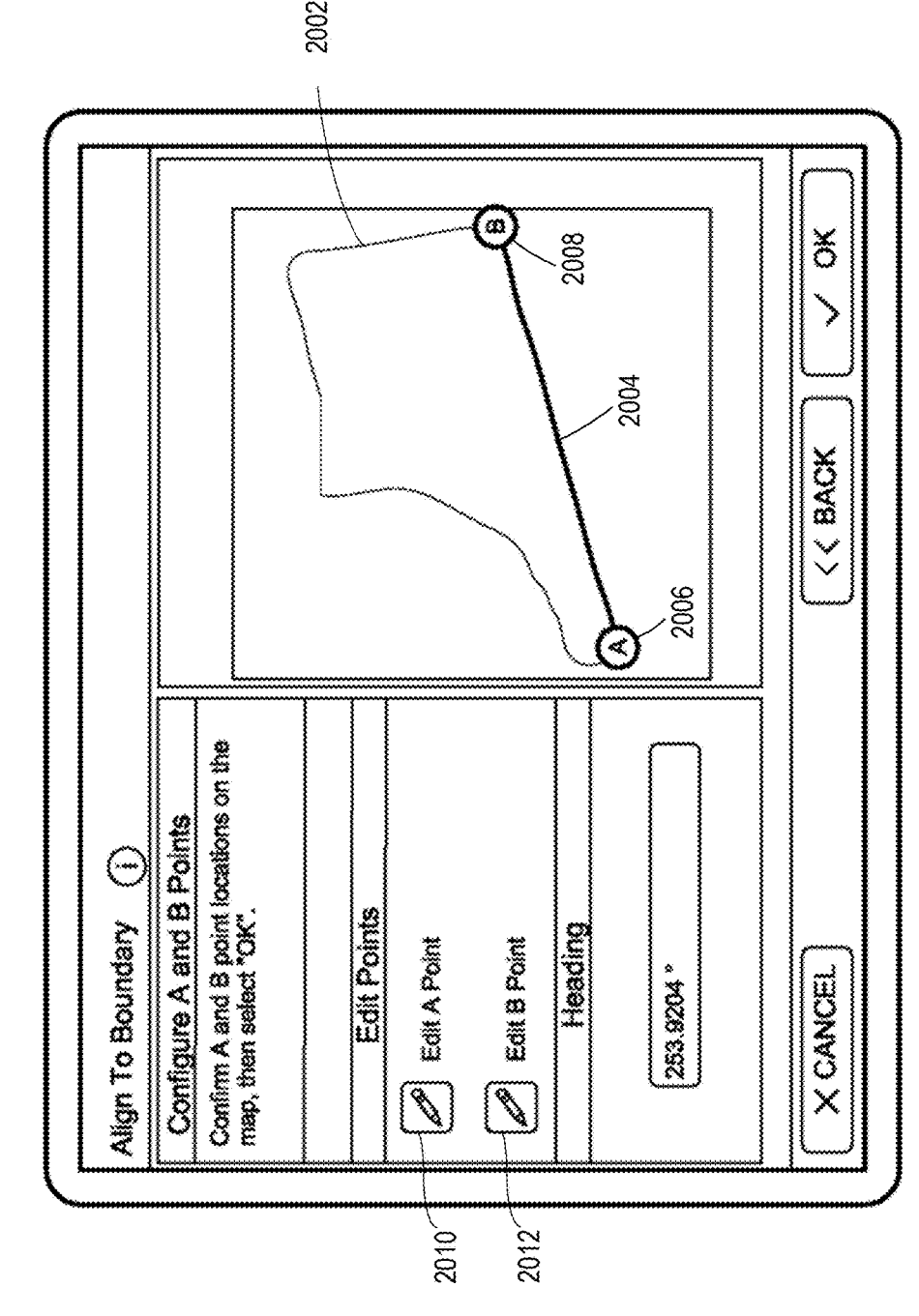
FIGS. 20-22 illustrate example displays of the user interface device of FIG. 11 as the vehicle path generation server executes the example machine readable instructions of FIG. 19.
Figure 21:
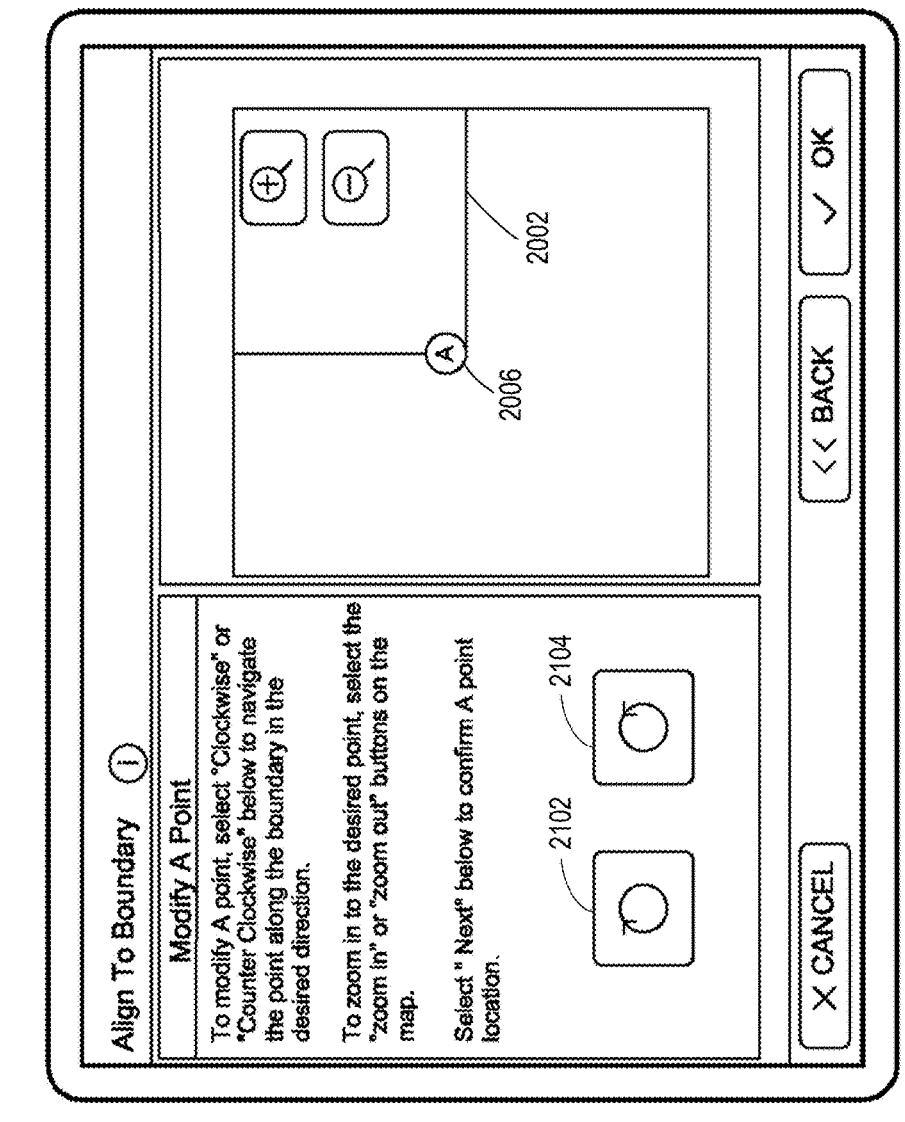
Figure 22:
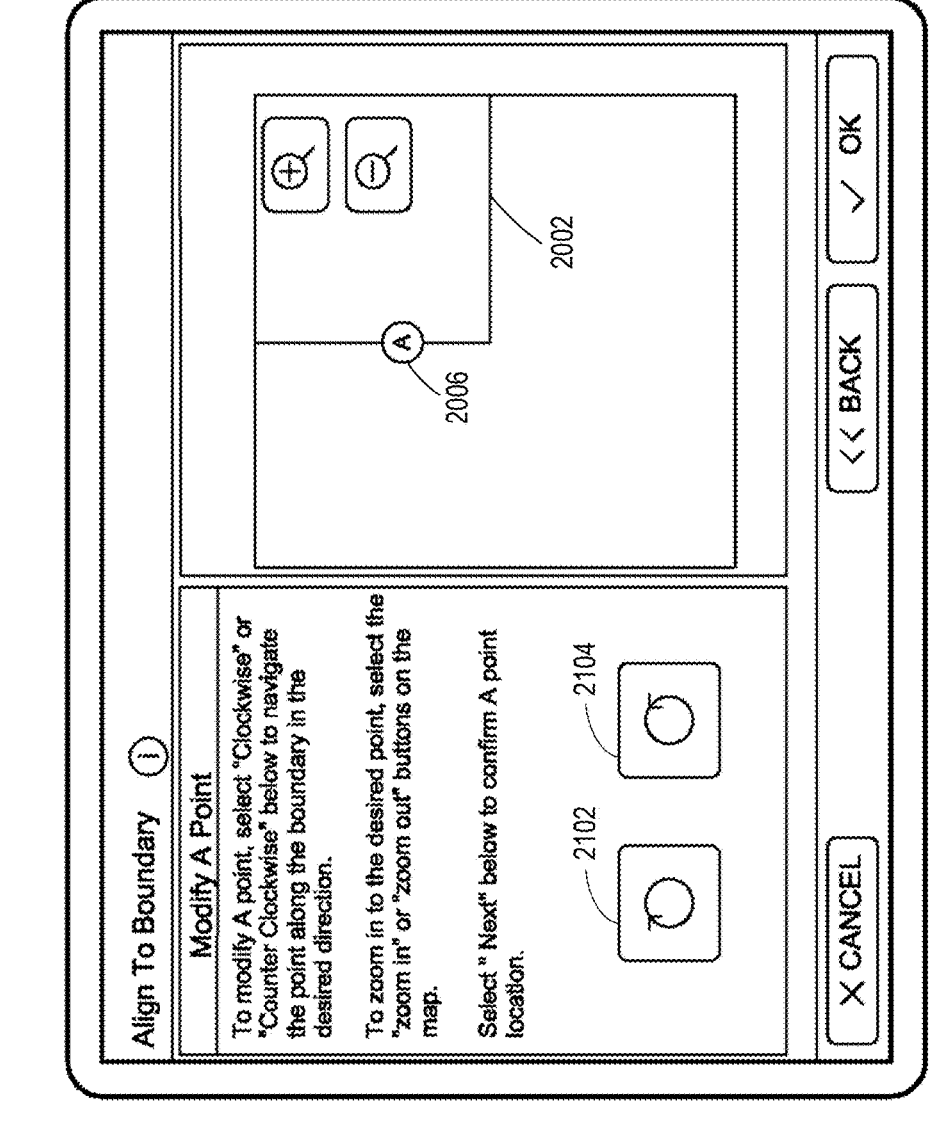

FIGS. 20-22 illustrate example displays of the user interface device 1102 of FIG. 11 as the edge adjustment circuitry 220 of the vehicle path generation server 105 executes the example machine readable instructions 312 of FIGS. 3 and 19. FIG. 20 is an example display 2000 of the user interface device 1102 after the edge adjustment circuitry 220 executes the example machine readable instructions at block 1900 of FIG. 19. The display 2000 shows an example boundary 2002 with an example selected edge 2004. The selected edge 2004 has a first endpoint 2006 (e.g., an edge start point) and a second endpoint 2008 (e.g., an edge endpoint). The first and second endpoints 2006 and 2008 were set by the edge detection circuitry 205 according to operations 304 of FIG. 4. The display 2000 includes an example first user input 2010 and an example second user input 2012. The first user input 2010 is an icon that can be selected by the user to edit the first endpoint 2006. The second user input 2012 is an icon that can be selected by the user to edit the second endpoint 2008.

FIG. 21 is an example display 2100 of the user interface device 1102 after the edge adjustment circuitry 220 executes the example machine readable instructions at blocks 1900 and 1902 of FIG. 19. The display 2100 shows a close view of the boundary 2002 and the first endpoint 2006 in response to the user selecting the first user input 2010 of FIG. 20. The user can select an example clockwise icon 2102 to move the first endpoint 2006 along the boundary 2002 in the clockwise direction. The user can select an example counterclockwise icon 2104 to move the first endpoint 2006 along the boundary 2002 in the counterclockwise direction.

FIG. 22 is an example display 2200 of the user interface device 1102 after the edge adjustment circuitry 220 executes the example machine readable instructions at blocks 1900 and 1902 of FIG. 19. The display 2100 shows a close view of the boundary 2002 and the first endpoint 2006 after the first endpoint 2006 has moved in response to the user selecting the clockwise icon 2102. In this fashion, the first endpoint 2006 has been modified to a new point on the boundary 2002. The first endpoint 2006 can be further modified by the user selecting the clockwise icon 2102 or the counterclockwise icon 2104. The clockwise icon 2102 or the counterclockwise icon 2104 can be selected any number of times to continue moving the first endpoint 2006 around the boundary. In some examples, the second endpoint 2008 of FIG. 20 can be adjusted in a similar way as shown in FIG. 22. In some examples the first endpoint 2006, the second endpoint 2008, or both the first and second endpoints 2006 and 2008 can be adjusted.

Figure 23:
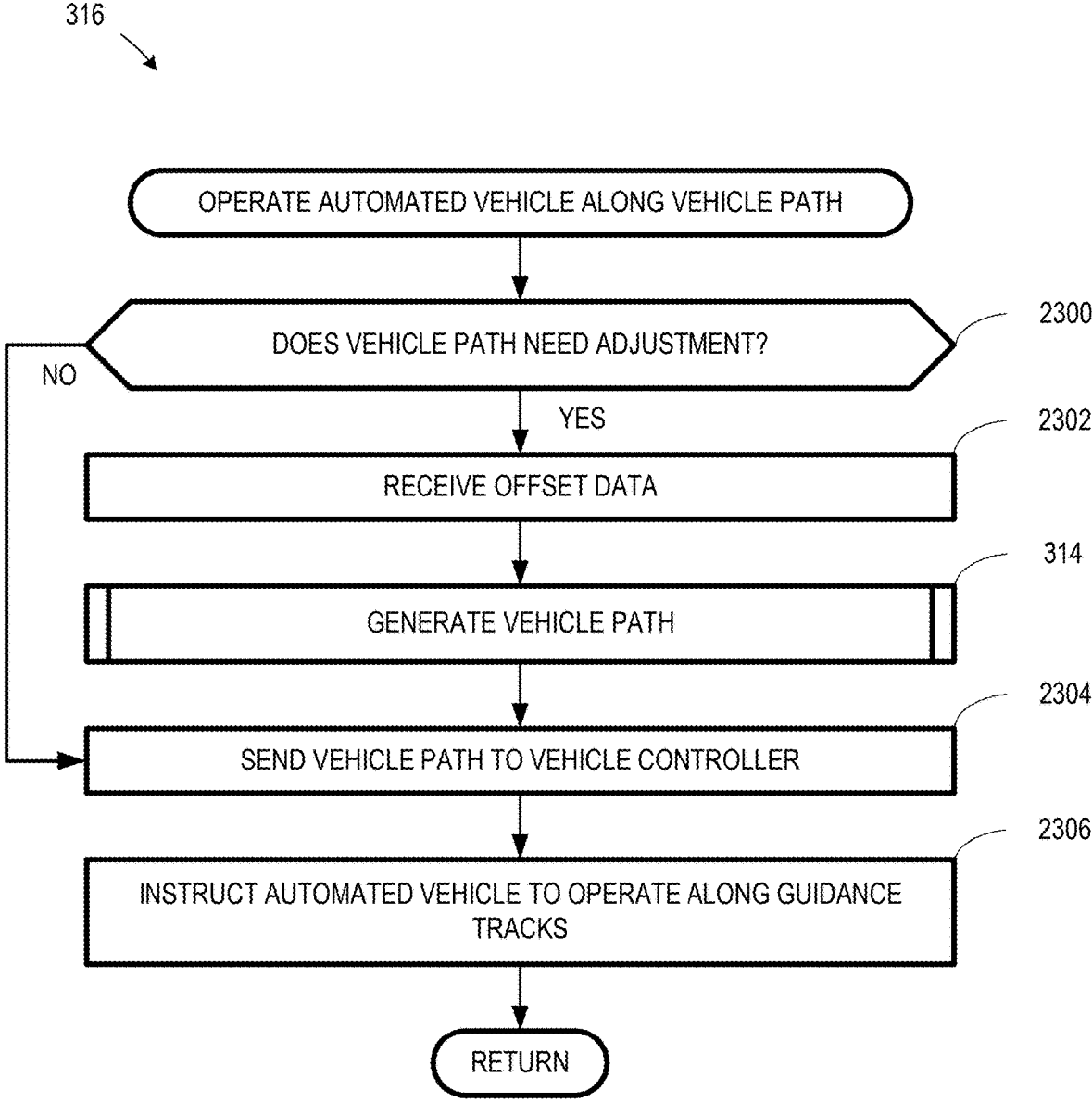
FIG. 23 is a flowchart representative of example machine readable instructions and/or example operations that may be executed, instantiated, and/or performed by example programmable circuitry to implement the operate automated vehicle along vehicle path operation of FIG. 3.

FIG. 23 is a flowchart representative of example machine readable instructions and/or example operations 316 that may be executed, instantiated, and/or performed by programmable circuitry to operate an automated vehicle along a vehicle path. The example machine-readable instructions and/or the example operations 316 of FIG. 23 begin at block 2300, at which the vehicle path generation server 105 receives user input to determine if the vehicle path needs to be adjusted. In some examples, the user may want to make small adjustments to the vehicle path. In other examples, the user may want to move the vehicle path to coincide with a current location of the vehicle (e.g., automated vehicle 110). If the user opts to adjust the guidance tracks at block 2300, the operations 316 continue to block 2302, at which vehicle offset circuitry 225 sends offset data to the vehicle path generation server 105. In some examples, the offset data are vehicle location data from the GPS circuitry 135 of the automated vehicle 110. In some examples, the offset data is an offset input by the user. The operations 316 continues at block 314, further detailed in FIG. 10, where the guidance tracks are modified with a new first track offset based on the offset data. In this way, tracks of the vehicle path remain substantially parallel to the best fit line of the selected edge but are shifted to align with the offset data (e.g., a desired location or the current location of the vehicle). The operation 316 continues at block 2304, where the vehicle path generation server 105 sends the vehicle path generated by the path generation circuitry 215 to the controller 115 to be stored in the memory 130. If the user opts to adjust the vehicle path at block 2300, the modified vehicle path is sent to the controller 115. If the user does not opt to adjust the vehicle path at block 2300, the operation 316 will move directly to block 2304 sending the unmodified vehicle path to the controller 115. In some examples, vehicle path is already stored on the memory 130 of the controller 115 and the vehicle path generation server 105 need only confirm the vehicle path matches the user selection. The operation 316 concludes at block 2306, at which the vehicle (e.g., automated vehicle 110) is instructed to operate along the previously sent vehicle path. The vehicle path is stored in the memory 130 of the controller 115 and the automated operation circuitry 145 sends control instructions to the automated vehicle 110 to maneuver through the vehicle path without input from the user.

Figure 24:
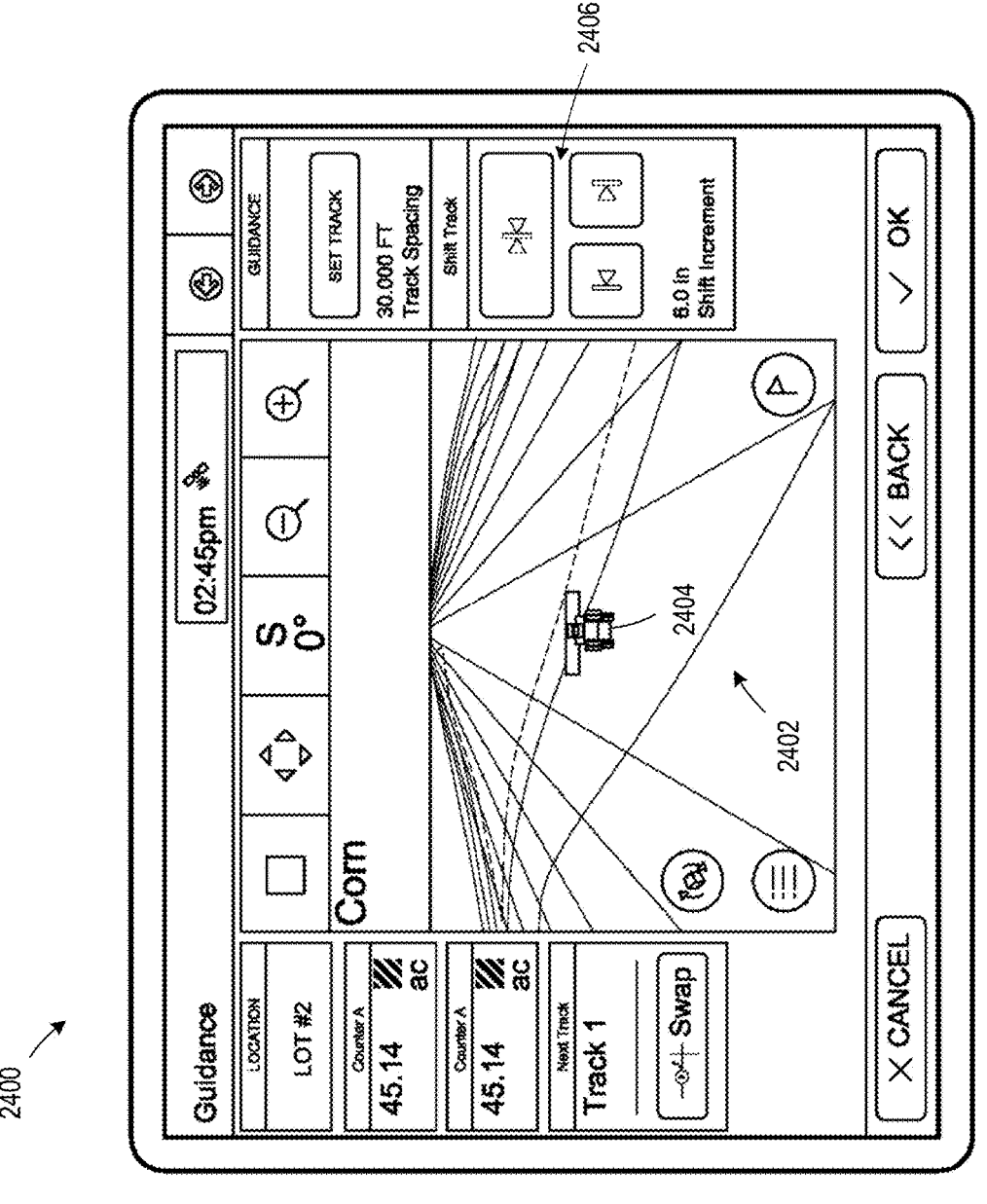
FIG. 24 illustrates an example display of the user interface device of FIG. 11 as the vehicle path generation server executes the example machine readable instructions of FIG. 23.

FIG. 24 illustrates an example display 2400 of the user interface device 1102 of FIG. 11 as the vehicle path generation server 105 executes the example machine readable instructions 316 of FIG. 23. In some examples, the path visualization circuitry 230 creates the display in response to the vehicle path being generated. The display 2400 shows an example vehicle path 2402 and an example vehicle icon 2404. The vehicle icon 2404 shows the location of the vehicle (e.g., automated vehicle 110) relative to the position of vehicle path 2402. In some examples, the vehicle location is provided by a GPS on the automated vehicle (e.g., the GPS circuitry 135). Example track adjustment icons 2406 are used to accept a user input to adjust the tracks, as described in blocks 2300 and 2302 of FIG. 23.

Figure 25:
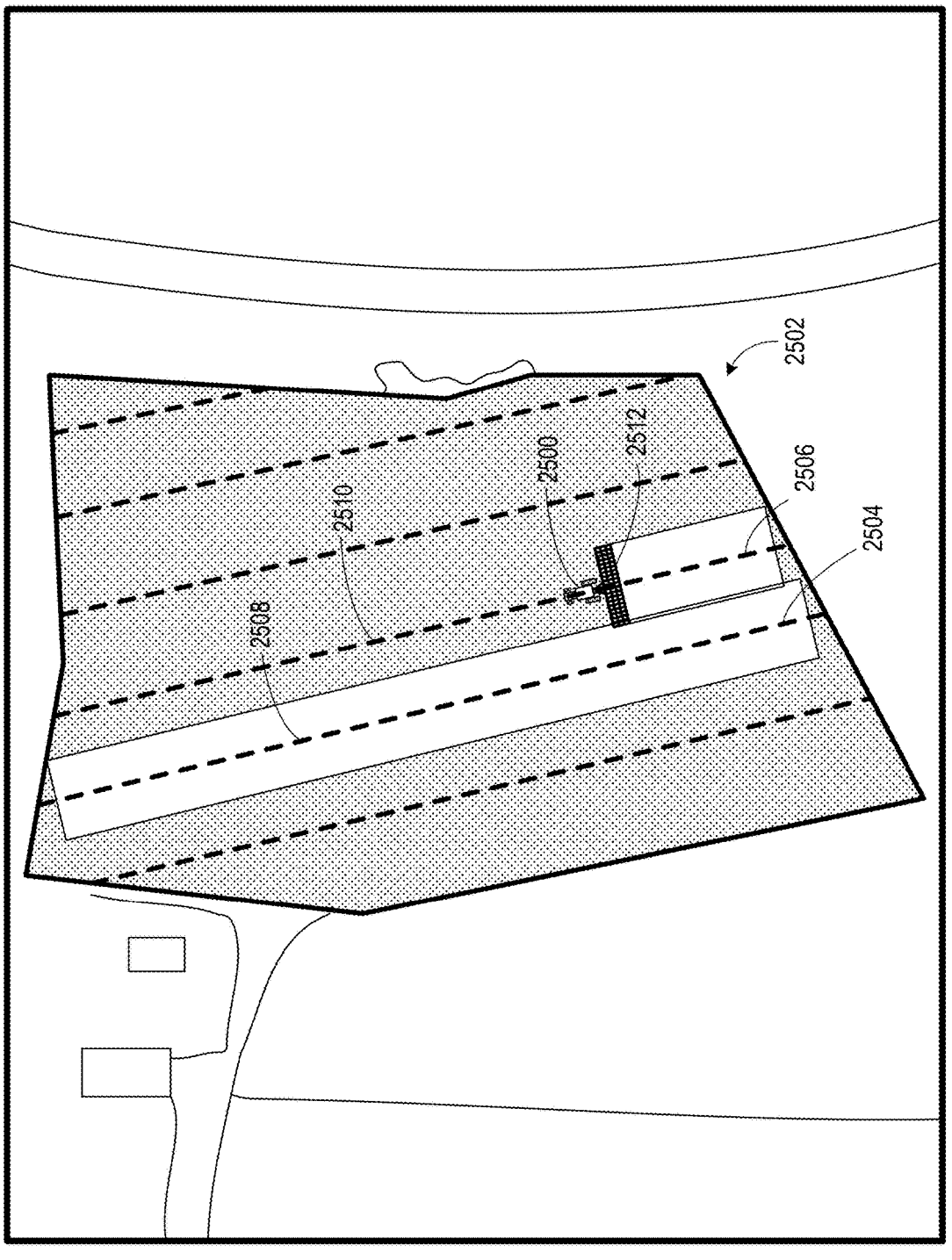
FIG. 25 illustrates an example automated vehicle operating along an example vehicle path generated by the vehicle path generation server.

FIG. 25 illustrates an example automated vehicle 2500 operating along an example vehicle path 2502 generated by the vehicle path generation server 105. The automated vehicle 2500 has completed a first pass 2504 and has progressed to a second pass 2506. The first and second passes 2504 and 2506 follow respective example tracks 2508 and 2510. The tracks 2508 and 2510 represent consecutive passes of the vehicle path 2502 separated by turns. The tracks 2508 and 2510 are spaced apart by a width of a working element 2512 (e.g., a working width), such that the first and second passes 2504 and 2506 are adjacent with little or no overlap. FIG. 25 is an example illustration of the execution of the machine readable instructions of block 2306 of FIG. 23.

Figure 26:
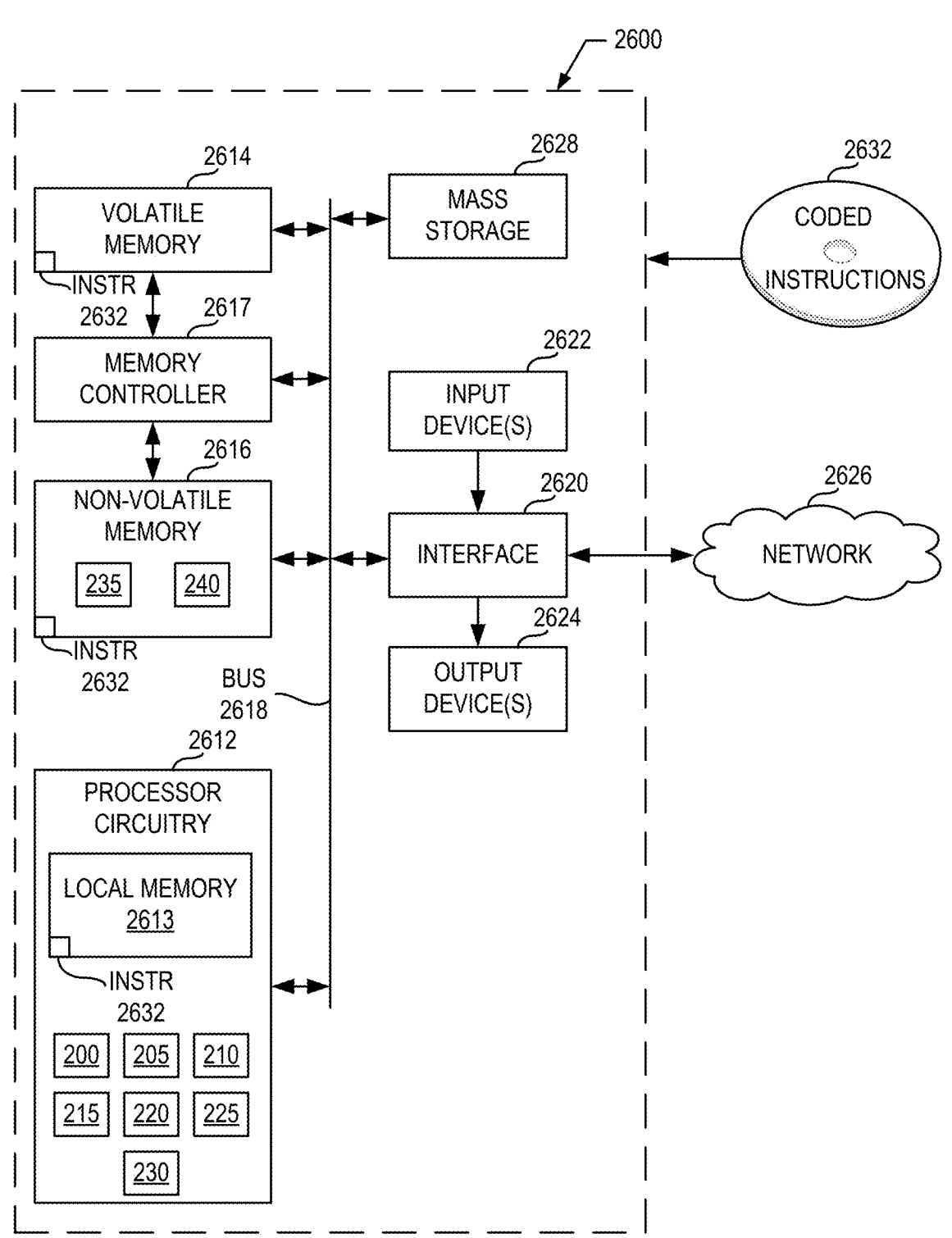
FIG. 26 is a block diagram of an example processing platform including programmable circuitry structured to execute, instantiate, and/or perform the example machine readable instructions and/or perform the example operations of FIGS. 3, 4, 9, 10, 19, and/or 23 to implement the vehicle path generation server of FIG. 2.

FIG. 26 is a block diagram of an example programmable circuitry platform 2600 structured to execute and/or instantiate the example machine-readable instructions and/or the example operations of FIGS. 3, 4, 9, 10, 19, and/or 23 to implement the vehicle path generation server 105 of FIG. 2. The programmable circuitry platform 2600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing and/or electronic device.

The programmable circuitry platform 2600 of the illustrated example includes programmable circuitry 2612. The programmable circuitry 2612 of the illustrated example is hardware. For example, the programmable circuitry 2612 can be implemented by one or more integrated circuits, logic circuits, FPGAs, microprocessors, CPUs, GPUs, DSPs, and/or microcontrollers from any desired family or manufacturer. The programmable circuitry 2612 may be implemented by one or more semiconductor based (e.g., silicon based) devices. In this example, the programmable circuitry 2612 implements the example field location circuitry 200, the example edge detection circuitry 205, the example edge analysis circuitry 210, the example path generation circuitry 215, the example edge adjustment circuitry 220, the example vehicle offset circuitry 225, the example path visualization circuitry 230, the example field boundary database 235, and the example vehicle database 240.

The programmable circuitry 2612 of the illustrated example includes a local memory 2613 (e.g., a cache, registers, etc.). The programmable circuitry 2612 of the illustrated example is in communication with main memory 2614, 2616, which includes a volatile memory 2614 and a non-volatile memory 2616, by a bus 2618. The volatile memory 2614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2616 may be implemented by flash memory and/or any other desired type of memory device. Access to the main memory 2614, 2616 of the illustrated example is controlled by a memory controller 2617. In some examples, the memory controller 2617 may be implemented by one or more integrated circuits, logic circuits, microcontrollers from any desired family or manufacturer, or any other type of circuitry to manage the flow of data going to and from the main memory 2614, 2616.

The programmable circuitry platform 2600 of the illustrated example also includes interface circuitry 2620. The interface circuitry 2620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2622 are connected to the interface circuitry 2620. The input device(s) 2622 permit(s) a user (e.g., a human user, a machine user, etc.) to enter data and/or commands into the programmable circuitry 2612. The input device(s) 2622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 2624 are also connected to the interface circuitry 2620 of the illustrated example. The output device(s) 2624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2620 of the illustrated example, thus, typically includes a graphics driver card, a graphics driver chip, and/or graphics processor circuitry such as a GPU.

The interface circuitry 2620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 2600 of the illustrated example also includes one or more mass storage discs or devices 2628 to store firmware, software, and/or data. Examples of such mass storage discs or devices 2628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 2632, which may be implemented by the machine readable instructions of FIGS. 3, 4, 9, 10, 19, and/or 23, may be stored in the mass storage device 2628, in the volatile memory 2614, in the non-volatile memory 2616, and/or on at least one non-transitory computer readable storage medium such as a CD or DVD which may be removable.

Figure 27:
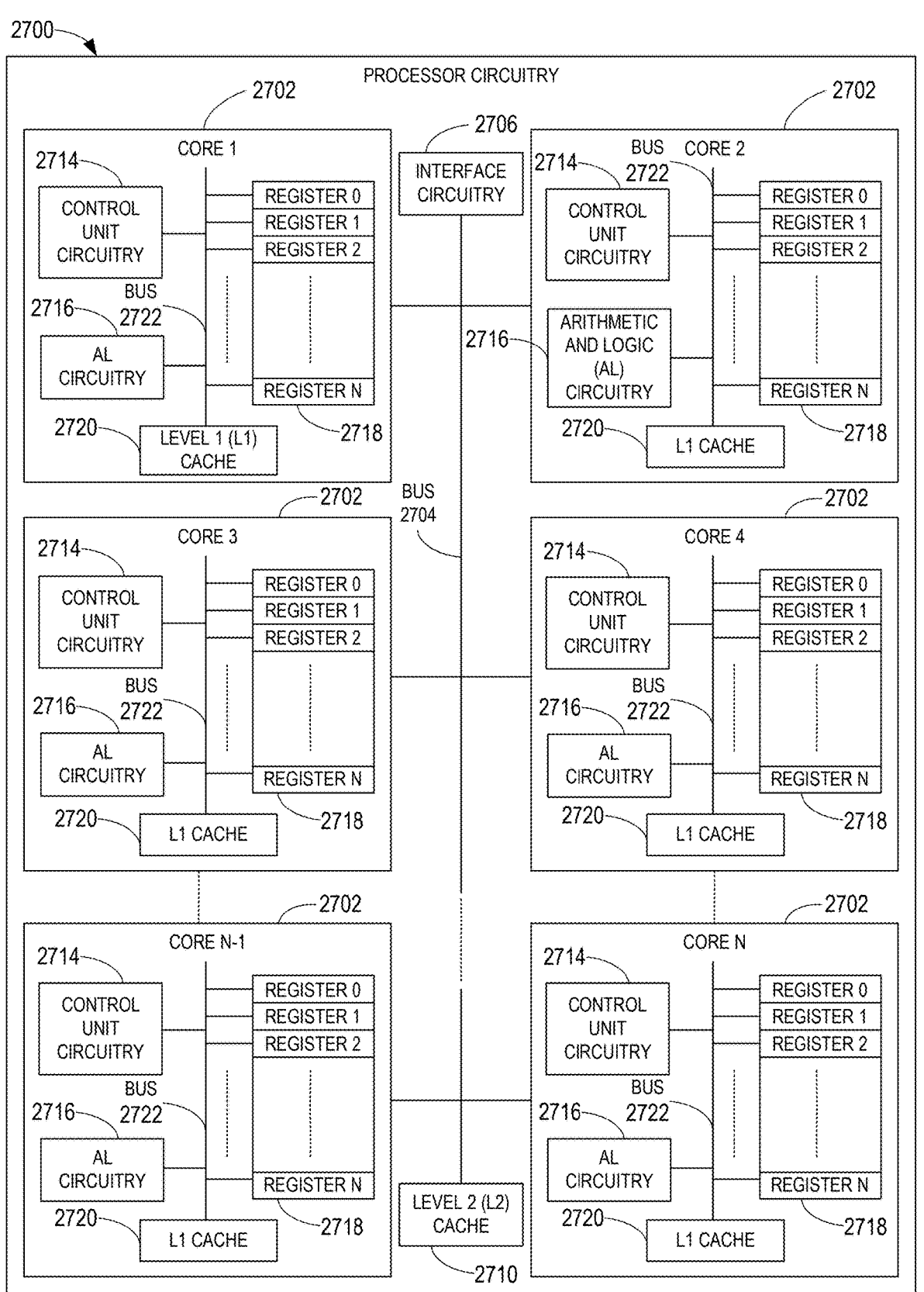
FIG. 27 is a block diagram of an example implementation of the programmable circuitry of FIG. 26.

FIG. 27 is a block diagram of an example implementation of the programmable circuitry 2612 of FIG. 26. In this example, the programmable circuitry 2612 of FIG. 26 is implemented by a microprocessor 2700. For example, the microprocessor 2700 may be a general-purpose microprocessor (e.g., general-purpose microprocessor circuitry). The microprocessor 2700 executes some or all of the machine-readable instructions of the flowcharts of FIGS. 3, 4, 9, 10, 19, and/or 23 to effectively instantiate the circuitry of FIG. 2 as logic circuits to perform operations corresponding to those machine readable instructions. In some such examples, the circuitry of FIG. 2 is instantiated by the hardware circuits of the microprocessor 2700 in combination with the machine-readable instructions. For example, the microprocessor 2700 may be implemented by multi-core hardware circuitry such as a CPU, a DSP, a GPU, an XPU, etc. Although it may include any number of example cores 2702 (e.g., 1 core), the microprocessor 2700 of this example is a multi-core semiconductor device including N cores. The cores 2702 of the microprocessor 2700 may operate independently or may cooperate to execute machine readable instructions. For example, machine code corresponding to a firmware program, an embedded software program, or a software program may be executed by one of the cores 2702 or may be executed by multiple ones of the cores 2702 at the same or different times. In some examples, the machine code corresponding to the firmware program, the embedded software program, or the software program is split into threads and executed in parallel by two or more of the cores 2702. The software program may correspond to a portion or all of the machine readable instructions and/or operations represented by the flowcharts of FIGS. 3, 4, 9, 10, 19, and/or 23.

The cores 2702 may communicate by a first example bus 2704. In some examples, the first bus 2704 may be implemented by a communication bus to effectuate communication associated with one(s) of the cores 2702. For example, the first bus 2704 may be implemented by at least one of an Inter-Integrated Circuit (I2C) bus, a Serial Peripheral Interface (SPI) bus, a PCI bus, or a PCIe bus. Additionally or alternatively, the first bus 2704 may be implemented by any other type of computing or electrical bus. The cores 2702 may obtain data, instructions, and/or signals from one or more external devices by example interface circuitry 2706. The cores 2702 may output data, instructions, and/or signals to the one or more external devices by the interface circuitry 2706. Although the cores 2702 of this example include example local memory 2720 (e.g., Level 1 (L1) cache that may be split into an L1 data cache and an L1 instruction cache), the microprocessor 2700 also includes example shared memory 2710 that may be shared by the cores (e.g., Level 2 (L2 cache)) for high-speed access to data and/or instructions. Data and/or instructions may be transferred (e.g., shared) by writing to and/or reading from the shared memory 2710. The local memory 2720 of each of the cores 2702 and the shared memory 2710 may be part of a hierarchy of storage devices including multiple levels of cache memory and the main memory (e.g., the main memory 2614, 2616 of FIG. 26). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2702 may be referred to as a CPU, DSP, GPU, etc., or any other type of hardware circuitry. Each core 2702 includes control unit circuitry 2714, arithmetic and logic (AL) circuitry (sometimes referred to as an ALU) 2716, a plurality of registers 2718, the local memory 2720, and a second example bus 2722. Other structures may be present. For example, each core 2702 may include vector unit circuitry, single instruction multiple data (SIMD) unit circuitry, load/store unit (LSU) circuitry, branch/jump unit circuitry, floating-point unit (FPU) circuitry, etc. The control unit circuitry 2714 includes semiconductor-based circuits structured to control (e.g., coordinate) data movement within the corresponding core 2702. The AL circuitry 2716 includes semiconductor-based circuits structured to perform one or more mathematic and/or logic operations on the data within the corresponding core 2702. The AL circuitry 2716 of some examples performs integer based operations. In other examples, the AL circuitry 2716 also performs floating-point operations. In yet other examples, the AL circuitry 2716 may include first AL circuitry that performs integer-based operations and second AL circuitry that performs floating-point operations. In some examples, the AL circuitry 2716 may be referred to as an Arithmetic Logic Unit (ALU).

The registers 2718 are semiconductor-based structures to store data and/or instructions such as results of one or more of the operations performed by the AL circuitry 2716 of the corresponding core 2702. For example, the registers 2718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 2718 may be arranged in a bank as shown in FIG. 27. Alternatively, the registers 2718 may be organized in any other arrangement, format, or structure, such as by being distributed throughout the core 2702 to shorten access time. The second bus 2722 may be implemented by at least one of an I2C bus, a SPI bus, a PCI bus, or a PCIe bus.

Each core 2702 and/or, more generally, the microprocessor 2700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2700 is a semiconductor device fabricated to include many transistors interconnected to implement the structures described above in one or more integrated circuits (ICs) contained in one or more packages.

The microprocessor 2700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 2700, in the same chip package as the microprocessor 2700 and/or in one or more separate packages from the microprocessor 2700.

Figure 28:
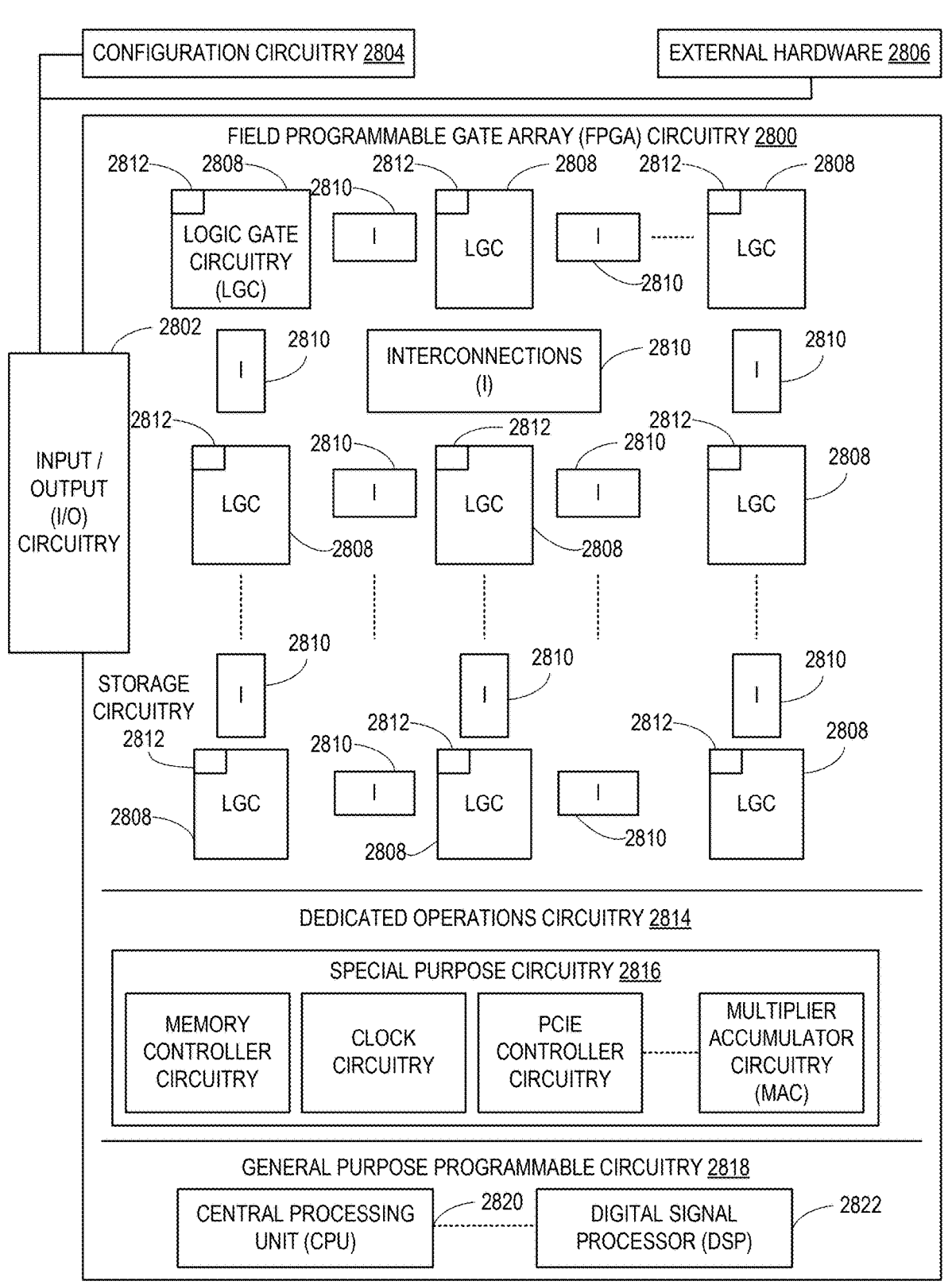
FIG. 28 is a block diagram of another example implementation of the programmable circuitry of FIG. 26.

FIG. 28 is a block diagram of another example implementation of the programmable circuitry 2612 of FIG. 26. In this example, the programmable circuitry 2612 is implemented by FPGA circuitry 2800. For example, the FPGA circuitry 2800 may be implemented by an FPGA. The FPGA circuitry 2800 can be used, for example, to perform operations that could otherwise be performed by the example microprocessor 2700 of FIG. 27 executing corresponding machine readable instructions. However, once configured, the FPGA circuitry 2800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 2700 of FIG. 27 described above (which is a general purpose device that may be programmed to execute some or all of the machine readable instructions represented by the flowchart(s) of FIGS. 3, 4, 9, 10, 19, and/or 23 but whose interconnections and logic circuitry are fixed once fabricated), the FPGA circuitry 2800 of the example of FIG. 28 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 3, 4, 9, 10, 19, and/or 23. In particular, the FPGA circuitry 2800 may be thought of as an array of logic gates, interconnections, and switches. The switches can be programmed to change how the logic gates are interconnected by the interconnections, effectively forming one or more dedicated logic circuits (unless and until the FPGA circuitry 2800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 3, 4, 9, 10, 19, and/or 23. As such, the FPGA circuitry 2800 may be configured and/or structured to effectively instantiate some or all of the operations/functions corresponding to the machine readable instructions of the flowchart(s) of FIGS. 3, 4, 9, 10, 19, and/or 23 as dedicated logic circuits to perform the operations/functions corresponding to those software instructions in a dedicated manner analogous to an ASIC. Therefore, the FPGA circuitry 2800 may perform the operations/functions corresponding to the some or all of the machine readable instructions of FIGS. 3, 4, 9, 10, 19, and/or 23 faster than the general-purpose microprocessor can execute the same.

In the example of FIG. 28, the FPGA circuitry 2800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 2800 of FIG. 28 may access and/or load the binary file to cause the FPGA circuitry 2800 of FIG. 28 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2800 of FIG. 28 to cause configuration and/or structuring of the FPGA circuitry 2800 of FIG. 28, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 2800 of FIG. 28 may access and/or load the binary file to cause the FPGA circuitry 2800 of FIG. 28 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 2800 of FIG. 28 to cause configuration and/or structuring of the FPGA circuitry 2800 of FIG. 28, or portion(s) thereof.

The FPGA circuitry 2800 of FIG. 28, includes example input/output (I/O) circuitry 2802 to obtain and/or output data to/from example configuration circuitry 2804 and/or external hardware 2806. For example, the configuration circuitry 2804 may be implemented by interface circuitry that may obtain a binary file, which may be implemented by a bit stream, data, and/or machine-readable instructions, to configure the FPGA circuitry 2800, or portion(s) thereof. In some such examples, the configuration circuitry 2804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 2806 may be implemented by external hardware circuitry. For example, the external hardware 2806 may be implemented by the microprocessor 2700 of FIG. 27.

The FPGA circuitry 2800 also includes an array of example logic gate circuitry 2808, a plurality of example configurable interconnections 2810, and example storage circuitry 2812. The logic gate circuitry 2808 and the configurable interconnections 2810 are configurable to instantiate one or more operations/functions that may correspond to at least some of the machine readable instructions of FIGS. 3, 4, 9, 10, 19, and/or 23 and/or other desired operations. The logic gate circuitry 2808 shown in FIG. 28 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2808 to enable configuration of the electrical structures and/or the logic gates to form circuits to perform desired operations/functions. The logic gate circuitry 2808 may include other electrical structures such as look-up tables (LUTs), registers (e.g., flip-flops or latches), multiplexers, etc.

The configurable interconnections 2810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2808 to program desired logic circuits.

The storage circuitry 2812 of the illustrated example is structured to store result(s) of the one or more of the operations performed by corresponding logic gates. The storage circuitry 2812 may be implemented by registers or the like. In the illustrated example, the storage circuitry 2812 is distributed amongst the logic gate circuitry 2808 to facilitate access and increase execution speed.

The example FPGA circuitry 2800 of FIG. 28 also includes example dedicated operations circuitry 2814. In this example, the dedicated operations circuitry 2814 includes special purpose circuitry 2816 that may be invoked to implement commonly used functions to avoid the need to program those functions in the field. Examples of such special purpose circuitry 2816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2800 may also include example general purpose programmable circuitry 2818 such as an example CPU 2820 and/or an example DSP 2822. Other general purpose programmable circuitry 2818 may additionally or alternatively be present such as a GPU, an XPU, etc., that can be programmed to perform other operations.

Although FIGS. 27 and 28 illustrate two example implementations of the programmable circuitry 2612 of FIG. 26, many other approaches are contemplated. For example, FPGA circuitry may include an on-board CPU, such as one or more of the example CPU 2820 of FIG. 27. Therefore, the programmable circuitry 2612 of FIG. 26 may additionally be implemented by combining at least the example micropro- cessor 2700 of FIG. 27 and the example FPGA circuitry 2800 of FIG. 28. In some such hybrid examples, one or more cores 2702 of FIG. 27 may execute a first portion of the machine readable instructions represented by the flowchart(s) of FIGS. 3, 4, 9, 10, 19, and/or 23 to perform first operation(s)/function(s), the FPGA circuitry 2800 of FIG. 28 may be configured and/or structured to perform second operation(s)/function(s) corresponding to a second portion of the machine readable instructions represented by the flowcharts of FIG. 3, 4, 9, 10, 19, and/or 23, and/or an ASIC may be configured and/or structured to perform third operation(s)/function(s) corresponding to a third portion of the machine readable instructions represented by the flow- charts of FIGS. 3, 4, 9, 10, 19, and/or 23.

It should be understood that some or all of the circuitry of FIG. 2 may, thus, be instantiated at the same or different times. For example, same and/or different portion(s) of the microprocessor 2700 of FIG. 27 may be programmed to execute portion(s) of machine-readable instructions at the same and/or different times. In some examples, same and/or different portion(s) of the FPGA circuitry 2800 of FIG. 28 may be configured and/or structured to perform operations/ functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 2700 of FIG. 27 may execute machine readable instructions in one or more threads executing concurrently and/or in series. In some examples, the FPGA circuitry 2800 of FIG. 28 may be configured and/or struc- tured to carry out operations/functions concurrently and/or in series. Moreover, in some examples, some or all of the circuitry of FIG. 2 may be implemented within one or more virtual machines and/or containers executing on the micro- processor 2700 of FIG. 27.

In some examples, the programmable circuitry 2612 of FIG. 26 may be in one or more packages. For example, the microprocessor 2700 of FIG. 27 and/or the FPGA circuitry 2800 of FIG. 28 may be in one or more packages. In some examples, an XPU may be implemented by the program- mable circuitry 2612 of FIG. 26, which may be in one or more packages. For example, the XPU may include a CPU (e.g., the microprocessor 2700 of FIG. 27, the CPU 2820 of FIG. 28, etc.) in one package, a DSP (e.g., the DSP 2822 of FIG. 28) in another package, a GPU in yet another package, and an FPGA (e.g., the FPGA circuitry 2800 of FIG. 28) in still yet another package.

Figure 29:
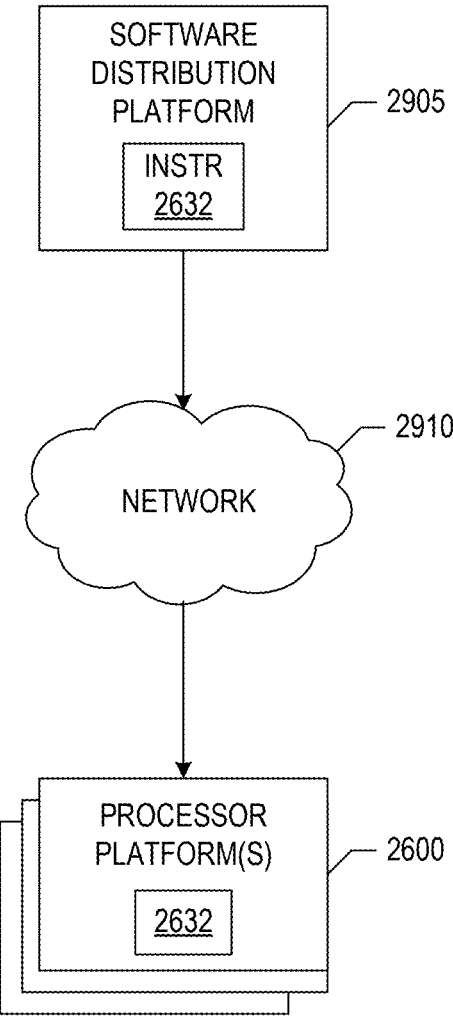
FIG. 29 is a block diagram of an example software/firmware/instructions distribution platform (e.g., one or more servers) to distribute software, instructions, and/or firmware (e.g., corresponding to the example machine readable instructions of FIGS. 3, 4, 9, 10, 19, and/or 23) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distri- bution platform 2905 to distribute software such as the example machine readable instructions 2632 of FIG. 26 to other hardware devices (e.g., hardware devices owned and/ or operated by third parties from the owner and/or operator of the software distribution platform) is illustrated in FIG. 29. The example software distribution platform 2905 may be implemented by any computer server, data facility, cloud service, etc., capable of storing and transmitting software to other computing devices. The third parties may be customers of the entity owning and/or operating the software distribu- tion platform 2905. For example, the entity that owns and/or operates the software distribution platform 2905 may be a developer, a seller, and/or a licensor of software such as the example machine readable instructions 2632 of FIG. 26. The third parties may be consumers, users, retailers, OEMs, etc., who purchase and/or license the software for use and/or re-sale and/or sub-licensing. In the illustrated example, the software distribution platform 2905 includes one or more servers and one or more storage devices. The storage devices store the machine readable instructions 2632, which may correspond to the example machine readable instructions of FIGS. 3, 4, 9, 10, 19, and/or 23, as described above. The one or more servers of the example software distribution plat- form 2905 are in communication with an example network 2910, which may correspond to any one or more of the Internet and/or any of the example networks described above. In some examples, the one or more servers are responsive to requests to transmit the software to a request- ing party as part of a commercial transaction. Payment for the delivery, sale, and/or license of the software may be handled by the one or more servers of the software distri- bution platform and/or by a third party payment entity. The servers enable purchasers and/or licensors to download the machine readable instructions 2632 from the software dis- tribution platform 2905. For example, the software, which may correspond to the example machine readable instruc- tions of FIG. 3, 4, 9, 10, 19, and/or 23, may be downloaded to the example programmable circuitry platform 2600, which is to execute the machine readable instructions 2632 to implement the vehicle path generation server 105. In some examples, one or more servers of the software distri- bution platform 2905 periodically offer, transmit, and/or force updates to the software (e.g., the example machine readable instructions 2632 of FIG. 26) to ensure improve- ments, patches, updates, etc., are distributed and applied to the software at the end user devices. Although referred to as software above, the distributed "software" could alterna- tively be firmware.

"Including" and "comprising" (and all forms and tenses thereof) are used herein to be open ended terms. Thus, whenever a claim employs any form of "include" or "com- prise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of pro- cesses, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein "substantially parallel" refers to parallel lines or paths that run next to each other without intersecting or getting measurably closer to one another. In the context of vehicle paths, vehicles move in directions that are not perfect lines in space. Vehicles may rise and fall along the topology of a field and vary slightly in heading based on unevenness of the ground. Thus, unless otherwise specified, "substantially parallel" refers to a line or path that does not approach or leave a neighboring line or path by more than 1% of the spacing between the lines or paths.

As used herein, the phrase "in communication," including variations thereof, encompasses direct communication and/ or indirect communication through one or more intermediary components, and does not require direct physical (e.g., wired) communication and/or constant communication, but rather additionally includes selective communication at periodic intervals, scheduled intervals, aperiodic intervals, and/ or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that generate automated vehicle paths within a boundary, based on a selected edge. Disclosed systems, apparatus, articles of manufacture, and methods improve the efficiency of using a computing device to generate a vehicle path based on an edge of a boundary by increasing the speed, accuracy, and repeatability of generating a vehicle path. The process of selecting an edge to base vehicle paths on requires a user to identify and select an edge. By automatically detecting edges, scoring the edges for suitability, and presenting the edges in order of suitability, the user can select an appropriate edge quickly and with simple inputs (e.g., touch controls). Furthermore, as the edges are detected automatically, the user can be confident that any subsequent vehicle path will match the previous vehicle paths generated by the system, even if the vehicle paths are for differently sized automated vehicles. In this way, vehicle paths can be used confidently where repeatability is important, such as agricultural activities that require consistent vehicle paths to avoid damaging crops. Disclosed systems, apparatus, articles of manufacture, and methods are accordingly directed to one or more improvement(s) in the operation of a machine such as a computer or other electronic and/or mechanical device.

The following paragraphs provide various examples of methods and apparatus to generate automated agricultural vehicle paths disclosed herein:

Example 1 includes an apparatus to generate automated agricultural vehicle paths comprising interface circuitry, machine readable instructions, and programmable circuitry. The programmable circuitry is to at least one of instantiate or execute the machine readable instructions to receive an indication of a field to be worked, obtain data representative of the field to be worked, the data indicating a field boundary, determine edges of the field boundary, analyze the edges of the field boundary for suitability of working the field, present edges on a user interface in order of suitability, from most suitable to least suitable, the edges to determine a basis of paths within the field boundary. In response to a user selecting a target edge of the edges, the programmable circuitry is to generate automated vehicle paths through the field, the paths being substantially parallel to the target edge and covering the field, and cause a vehicle to perform an agricultural function following the paths.

Example 2 includes the apparatus of example 1, wherein determining the edges of the field boundary includes categorizing the edges as straight edges, drivably straight edges, or curved edges.

Example 3 includes the apparatus of example 1, wherein suitability includes at least one of a length of an edge, a straightness of an edge, or an alignment with the field boundary.

Example 4 includes the apparatus of example 1, wherein suitability is determined by an efficiency of the automated vehicle path generated based on the target edge.

Example 5 includes the apparatus of example 4, wherein the efficiency of the automated vehicle path includes at least one of a number of tracks to cover the field, a number of turns in the automated vehicle path, an amount of total time the vehicle spends on the automated vehicle path, or an amount time the vehicle spends turning on the automated vehicle path.

Example 6 includes the apparatus of example 1, wherein the user selecting the target edge includes receiving an input from the user through a touch screen device.

Example 7 includes the apparatus of example 1, wherein the user selecting the target edge includes the user modifying at least one of a start point or an end point of the target edge.

Example 8 includes the apparatus of example 1, wherein the target edge is a curved edge and the automated vehicle path includes curved portions offset from the target edge.

Example 9 includes a vehicle mounted touch screen apparatus to direct a vehicle along a path comprising an automated vehicle, the vehicle having a working implement, and a touch screen computer. The touch screen computer includes interface circuitry, machine readable instructions, and programmable circuitry. The programmable circuitry is to at least on of instantiate or execute the machine readable instructions to determine a target operating environment near the vehicle, obtain data representative of the target operating environment, the data indicating a working boundary, determine edges of the working boundary, and generate vehicle paths. Ones of the vehicle paths based on corresponding ones of the edges, the vehicle paths being substantially parallel to the corresponding edges. The programmable circuitry is to further present edges to a user on the touch screen computer, the edges sorted by a quality of the corresponding vehicle paths, receive from the user a touch input to select an edge, display the selected edge and a corresponding selected vehicle path, and in response to a user input, begin automated operation of the vehicle, the vehicle to perform a task with the working implement along the selected vehicle path.

Example 10 includes the vehicle mounted touch screen apparatus of example 9, wherein the quality of the vehicle paths is at least one of a number of passes to cover the operating environment, a number of turns in the vehicle paths, an amount of total time the vehicle spends on the vehicle paths, or an amount time the vehicle spends turning on the vehicle paths.

Example 11 includes the vehicle mounted touch screen apparatus of example 9, wherein determining the target operating environment includes receiving location data from the vehicle or the user.

Example 12 includes the vehicle mounted touch screen apparatus of example 9, wherein receiving user touch input of the selected edge further includes the user modifying at least one of a start point or an end point of the selected edge.

Example 13 includes the vehicle mounted touch screen apparatus of example 9, wherein the working implement is mounted to the vehicle or towed from behind the vehicle.

Example 14 includes the vehicle mounted touch screen apparatus of example 9, wherein the selected edge is a curve and the corresponding vehicle path includes offset curves.

Example 15 includes a non-transitory machine readable storage medium comprising instructions to cause programmable circuitry to at least locate a field to be worked, receive boundary data of the field, the boundary data representing a perimeter of the field, detect edges within the boundary data, evaluate the edges for a suitability of working the field, present edges in order of suitability to a user, the user to select a target edge, generate a vehicle path, the vehicle path to be substantially parallel to the target edge, and instruct an automated vehicle to perform work along the vehicle path.

Example 16 includes the non-transitory machine readable storage medium of example 15, wherein detecting the edges includes making a plurality of curvature measurements of the perimeter, detecting continuous portions of the perimeter where curvature is less than a turning radius of the automated vehicle, and labeling detected continuous portions as edges.

Example 17 includes the non-transitory machine readable storage medium of example 15, wherein the suitability includes at least one of a length, a straightness, or an efficiency of a vehicle path based on an edge.

Example 18 includes the non-transitory machine readable storage medium of example 17, wherein the efficiency of a vehicle path based on the edge includes at least one of a number of turns, a total drive time of the vehicle path, or a total turning time of the vehicle path.

Example 19 includes the non-transitory machine readable storage medium of example 15, wherein generating the vehicle path includes positioning the vehicle path to include a first pass, the first pass being a longest possible straight line operation of the automated vehicle within the perimeter and substantially parallel to the target edge.

Example 20 includes the non-transitory machine readable storage medium of example 15, wherein selecting the target edge includes selecting an endpoint of the target edge, moving the endpoint around the perimeter in a clockwise or counterclockwise direction, and modifying the target edge to have the moved endpoint.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus to generate automated agricultural vehicle paths comprising:

interface circuitry;

machine readable instructions; and programmable circuitry to at least one of instantiate or execute the machine readable instructions to:

receive an indication of a field to be worked;

obtain data representative of the field to be worked, the data indicating a perimeter of the field;

make a plurality of curvature measurements of a perimeter;

detect continuous portions of the perimeter where curvature is less than a turning radius of an automated vehicle;

label detected continuous portions as edges of the field;

analyze the edges of the field for suitability of working the field;

present edges on a user interface in order of suitability, from most suitable to least suitable, the edges to determine a basis of paths within the field;

in response to a user selecting a target edge of the edges, generate automated vehicle paths through the field, the paths being substantially parallel to the target edge and covering the field; and cause a vehicle to perform an agricultural function following the paths.

2. The apparatus of claim 1, wherein determining the edges of the field includes categorizing the edges as straight edges, edges that are curved but drivable, or edges that are curved and not drivable.

3. The apparatus of claim 1, wherein suitability includes at least one of a length of an edge, a straightness of an edge, or an alignment with the field boundary.

4. The apparatus of claim 1, wherein suitability is determined by an efficiency of the automated vehicle paths generated based on the target edge.

5. The apparatus of claim 4, wherein the efficiency of the automated vehicle paths includes at least one of a number of tracks to cover the field, a number of turns in the automated vehicle paths, an amount of total time the vehicle spends on the automated vehicle paths, or an amount time the vehicle spends turning on the automated vehicle paths.

6. The apparatus of claim 1, wherein the user selecting the target edge includes receiving an input from the user through a touch screen device.

7. The apparatus of claim 1, wherein the user selecting the target edge includes the user modifying at least one of a start point or an end point of the target edge.

8. The apparatus of claim 1, wherein the target edge is a curved edge and the automated vehicle paths includes curved portions offset from the target edge.

9. A vehicle mounted touch screen apparatus to direct a vehicle along a path comprising:

an automated vehicle, the vehicle having a working implement; and a touch screen computer including:

interface circuitry;

machine readable instructions; and programmable circuitry to at least one of instantiate or execute the machine readable instructions to:

determine a target operating environment of the vehicle;

obtain data representative of the target operating environment, the data indicating a perimeter of a field;

determine edges of the field;

generate vehicle paths, ones of the vehicle paths based on corresponding ones of the edges, the vehicle paths being substantially parallel to the corresponding edges;

present edges to a user on the touch screen computer, the edges sorted by a quality of the corresponding vehicle paths;

in response to a user input, display a selected edge and a corresponding selected vehicle path;

in response to a user input, modify the selected edge by moving a selected endpoint of the edge around the perimeter in a clockwise or counterclockwise direction; and begin automated operation of the vehicle after the modification, the vehicle to perform a task with the working implement along the selected vehicle path.

10. The vehicle mounted touch screen apparatus of claim 9, wherein the quality of the vehicle paths is at least one of a number of passes to cover the operating environment, a number of turns in the vehicle paths, an amount of total time the vehicle spends on the vehicle paths, or an amount time the vehicle spends turning on the vehicle paths.

11. The vehicle mounted touch screen apparatus of claim 9, wherein determining the target operating environment includes receiving location data from the vehicle or the user.

12. The vehicle mounted touch screen apparatus of claim 9, wherein receiving user touch input of the selected edge further includes the user modifying at least one of a start point or an end point of the selected edge.

13. The vehicle mounted touch screen apparatus of claim 9, wherein the working implement is mounted to the vehicle or towed from behind the vehicle.

14. The vehicle mounted touch screen apparatus of claim 9, wherein the selected edge is a curve and the corresponding vehicle path includes offset curves.

15. A non-transitory machine readable storage medium comprising instructions to cause programmable circuitry to at least:

locate a field to be worked;

receive boundary data of the field, the boundary data representing a perimeter of the field;

detect edges within the boundary data;

evaluate the edges for a suitability of working the field;

present edges in order of suitability to a user, the user to select a target edge;

generate a vehicle path having a first pass that is a longest possible line operation of an automated vehicle within the perimeter, the longest possible line and the vehicle path to be substantially parallel to the target edge; and control an automated vehicle to perform work along the vehicle path.

16. The non-transitory machine readable storage medium of claim 15, wherein the suitability includes at least one of a length, a straightness, or an efficiency of the vehicle path based on an edge.

17. The non-transitory machine readable storage medium of claim 16, wherein the efficiency of the vehicle path based on the edge includes at least one of a number of turns, a total drive time of the vehicle path, or a total turning time of the vehicle path.

18. The non-transitory machine readable storage medium of claim 15, wherein the longest possible line is a straight line.

* * * * *